United States Patent
Van Der Tempel et al.

(10) Patent No.: US 12,117,350 B2
(45) Date of Patent: Oct. 15, 2024

(54) SYSTEM AND METHOD FOR MEASURING OCCUPANT-LEVEL TEMPERATURE

(71) Applicant: SIGNIFY HOLDING B.V., Eindhoven (NL)

(72) Inventors: Leendert Van Der Tempel, Eindhoven (NL); Bernardus Johannes Pronk, Eindhoven (NL); Koen Johanna Guillaume Holtman, Eindhoven (NL); Harry Broers, 'S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 483 days.

(21) Appl. No.: 17/439,625

(22) PCT Filed: Mar. 20, 2020

(86) PCT No.: PCT/EP2020/057799
§ 371 (c)(1),
(2) Date: Sep. 15, 2021

(87) PCT Pub. No.: WO2020/193413
PCT Pub. Date: Oct. 1, 2020

(65) Prior Publication Data
US 2022/0178764 A1 Jun. 9, 2022

(30) Foreign Application Priority Data
Mar. 25, 2019 (EP) .................................... 19164793

(51) Int. Cl.
*G01K 1/20* (2006.01)
*G01K 15/00* (2006.01)
(Continued)

(52) U.S. Cl.
CPC .............. *G01K 1/20* (2013.01); *G01K 15/005* (2013.01); *H05B 45/18* (2020.01); *G05B 17/02* (2013.01)

(58) Field of Classification Search
CPC ........ G01K 1/20; G01K 15/005; H05B 45/18; G05B 17/02
See application file for complete search history.

(56) References Cited

U.S. PATENT DOCUMENTS

| 5,926,778 A | 7/1999 | Poppel |
| 2006/0165149 A1* | 7/2006 | Kolk .................. G01K 1/20 340/584 |

(Continued)

FOREIGN PATENT DOCUMENTS

| EP | 3396263 A1 | 10/2018 | |
| JP | 2016208301 A * | 12/2016 | .......... F24F 11/0086 |
| WO | 2018054770 A1 | 3/2018 | |

*Primary Examiner* — Mirellys Jagan

(57) ABSTRACT

A method (300) for determining temperature in a region (220/230) of an environment (200) by compensating for heat-up of a temperature sensor caused by ambient air and/or electronic heating, using a system (100) comprising: (i) a structure (110); (ii) a controller (130); and (iii) a temperature sensor (120), the method comprising: obtaining (320) first temperature measurements while the structure is in a first operating mode; changing (330) the first operating mode of the structure to a second operating mode; obtaining (340) second temperature measurements while the structure is in the second operating mode; determining (350) a temperature correction comprising an effect of the second operating mode on the temperature sensor; obtaining (360) a new temperature measurement during operation of the structure in the second operating mode; and adjusting (370), using the temperature correction, the new temperature measurement to generate a compensated temperature measurement.

13 Claims, 18 Drawing Sheets

(51) Int. Cl.
 *G05B 17/02* (2006.01)
 *H05B 45/18* (2020.01)

(56) References Cited

U.S. PATENT DOCUMENTS

2016/0116178 A1  4/2016  Vega
2016/0313190 A1  10/2016  Miyajima
2017/0023272 A1  1/2017  Erickson et al.

* cited by examiner

SYSTEM AND METHOD FOR MEASURING OCCUPANT-LEVEL TEMPERATURE

CROSS-REFERENCE TO PRIOR APPLICATIONS

This application is the U.S. National Phase application under 35 U.S.C. § 371 of International Application No. PCT/EP2020/057799, filed on Mar. 20, 2020, which claims the benefit of European Patent Application No. 19164793.2, filed on Mar. 25, 2019. These applications are hereby incorporated by reference herein.

FIELD OF THE INVENTION

The present disclosure is directed generally to systems and methods for determining air temperature at the occupant level of a room using a temperature sensor located distal from the occupant level of the room.

BACKGROUND

Heating, ventilation, and air conditioning (HVAC) systems usually rely on room temperature measurement using a wall-mounted sensor and a thermostat. The temperature sensor is usually positioned somewhere in the room away from doors and windows, usually at a level near the average height of a human head. The air temperature there turns out usefully representative for the perceived air temperature all over the room, despite sunshine and draughts.

However, wall-mounted temperature sensors present several limitations. For example, they require additional effort and cost since they are mounted into or onto wall surfaces. This requires HVAC design, wiring, and device installation, usually by HVAC specialists. Additionally, in large spaces it will be challenging or impossible for wall-mounted temperature sensors to accurately measure the temperature in the central region of the room.

Temperature sensors can be located within and/or otherwise associated with room to provide temperature measurements at a wide variety of locations including large spaces. For example, the temperature sensors might be mounted on or in luminaires, ceiling tiles, fans, other ceiling structures, lighting components, and in or on other structures in a space. In some circumstances, association of a temperature sensor with a structure in the space enables rapid installation of the temperature sensor. As one example, a sensor may be associated with ceiling-mounted sensing devices. Within a connected lighting infrastructure one can find sensors associated within or integrated within the luminaire and/or lighting element, and/or associated with or integrated within devices such as a security camera, or as a standalone sensor, among many other options. According to other devices, stand-alone sensors may comprise an embedded lighting unit that influences the temperature sensor, such as a security camera or time-of-flight camera with active illumination.

Existing systems using temperature sensors comprise several problems. For example, temperature sensors located at or near a ceiling would be affected by thermal stratification of the air in the space. Indeed, there will typically be a significant thermal boundary layer under a hot ceiling-mounted luminaire or similar building element. Even more problematically, temperature sensors are affected by thermal conduction and radiation from power dissipaters such as LEDs, drivers, and signal processors, causing the sensor to obtain artificially high readings.

Although sensors such as contactless infrared temperature sensors may remotely obtain sensor readings from within a space, using these sensors produces several important limitations. For example, infrared temperature sensors obtain measurements from surfaces such as desks or tables that can experience a significant lag in temperature change and thus do not provide accurate readings. Furthermore, temperature sensors are less accurate and more expensive than other temperature sensors and require a visible lens.

Accordingly, there is a continued need in the art for sensor systems and methods that enable temperature sensors to accurately determine the temperature of a space.

SUMMARY OF THE INVENTION

The present disclosure is directed to inventive methods and apparatus for detecting occupant-level air temperature of a space using one or more temperature sensors. Various embodiments and implementations herein are directed to a system comprising a temperature sensor associated with a luminaire or other structure that may generate heat. The temperature sensor obtains temperature readings while the luminaire or other structure experiences a status change such as turning on or off, or changing a setting or mode. Alternatively, the temperature of the space can be detected during this calibration period using other sensors such as an adjacent sensor in an adjacent luminaire, among others. As yet another example, the system can extrapolate the temperature change over the calibration period given start/end temperatures. The system uses these temperature readings to analyze the effect of the status change on the temperature sensor, and determines a temperature correction that accounts for that effect. The system can use the determined temperature correction to modify new temperature readings when the structure experiences the same status change. According to an embodiment, the temperature correction may apply convolution of the measured step/ramp or other response with the dimming history.

Generally, in one aspect, a method for determining temperature in a region of an environment by compensating for heat-up of a temperature sensor caused by ambient air and/or electronic heating is provided. The method includes the steps of: (i) providing a system comprising a structure in the environment; a controller; and a temperature sensor associated with the structure; (ii) obtaining, using the temperature sensor, one or more first temperature measurements while the structure is in a first operating mode; (iii) changing the first operating mode of the structure to a second operating mode; (iv) obtaining, using the temperature sensor, one or more second temperature measurements while the structure is in the second operating mode; (v) determining, by the controller using the one or more first temperature measurements and the one or more second temperature measurements, a temperature correction comprising an effect of the second operating mode of the structure on the temperature sensor; (vi) obtaining, using the temperature sensor after a temperature correction is determined, a new temperature measurement during operation of the structure in the second operating mode; and (vii) adjusting, using the temperature correction, the new temperature measurement to generate a compensated temperature measurement.

According to an embodiment, the method further includes communicating the compensated temperature measurement.

According to an embodiment, a temperature correction is determined for a plurality of operating modes of the structure.

According to an embodiment, the step of determining a temperature correction further comprises modification of a preexisting temperature correction model associated with the structure.

According to an embodiment the system comprises a sensor box comprising the temperature sensor, wherein the sensor box is associated with the structure.

According to an embodiment, the temperature correction compensates for heat generated by a controller of the system.

According to an embodiment, the step of determining a temperature correction comprises one or more temperature measurements from an adjacent structure.

According to an embodiment, the first operating mode is a first dimming level of a luminaire and the second operating mode is a second dimming level of the luminaire, the first dimming level and the second dimming level being different dimming levels.

According to an embodiment, the temperature correction comprises a first order thermal model.

According to an aspect is a system configured to determine temperature in a region of an environment by compensating for heat-up of a temperature sensor caused by ambient air and/or electronic heating. The system includes: a structure in the environment; a controller; a temperature sensor associated with the structure and configured to obtain: (i) one or more first temperature measurements while the structure is in a first operating mode; and (ii) one or more second temperature measurements while the structure is in the second operating mode; and a controller configured to: (i) change the first operating mode of the structure to the second operating mode; (ii) determine, using the one or more first temperature measurements and the one or more second temperature measurements, a temperature correction comprising an effect of the second operating mode of the structure on the temperature sensor; and (iii) adjust, using the temperature correction to generate a compensated temperature measurement, a new temperature measurement obtained during operation of the structure in the second operating mode.

According to an embodiment, the controller is further configured to direct the system to communicate the compensated temperature measurement.

According to an embodiment, the system comprises a sensor box comprising the temperature sensor, and wherein the sensor box is associated with the structure. According to an embodiment, the sensor box comprises a second sensor different from the temperature sensor.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a system configured to obtain temperature readings using a temperature sensor. More generally, Applicant has recognized that it would be beneficial to provide a temperature sensing system that enables occupant-level temperature detection without requiring occupant-level temperature sensors. A particular goal of utilization of certain embodiments of the present disclosure is to characterize occupant-level temperature of a space using affordable and easy-to-install sensors associated with a luminaire or other structure in the space.

In view of the foregoing, various embodiments and implementations are directed to a system with a temperature sensor associated with a luminaire or other structure. For example, the temperature sensor may be integral to or associated with a sensor module for an environment, which in turn might be integrated into or otherwise associated with a luminaire, a lighting component, another sensor, a ceiling-based structure such as a ceiling tile, fan, or other ceiling structure, or otherwise associated with a structure in a space. This sensor module may comprise more than one type of sensor. A controller of the system receives and analyzes the temperature sensor information to determine the effect of a heat-generating luminaire or other structure on the temperature sensor. The system can then use a temperature correction to modify new temperature readings when the structure is generating heat.

Such a system can be mounted in any structure within the space, and/or in a sensor box that is optionally associated with that structure, and can comprise affordable temperature sensors. The system enables accurate detection of temperature at the occupant level despite thermal stratification, thermal boundary layers, luminaire heating and/or internal heat spreading, among other issues.

Figure 1:
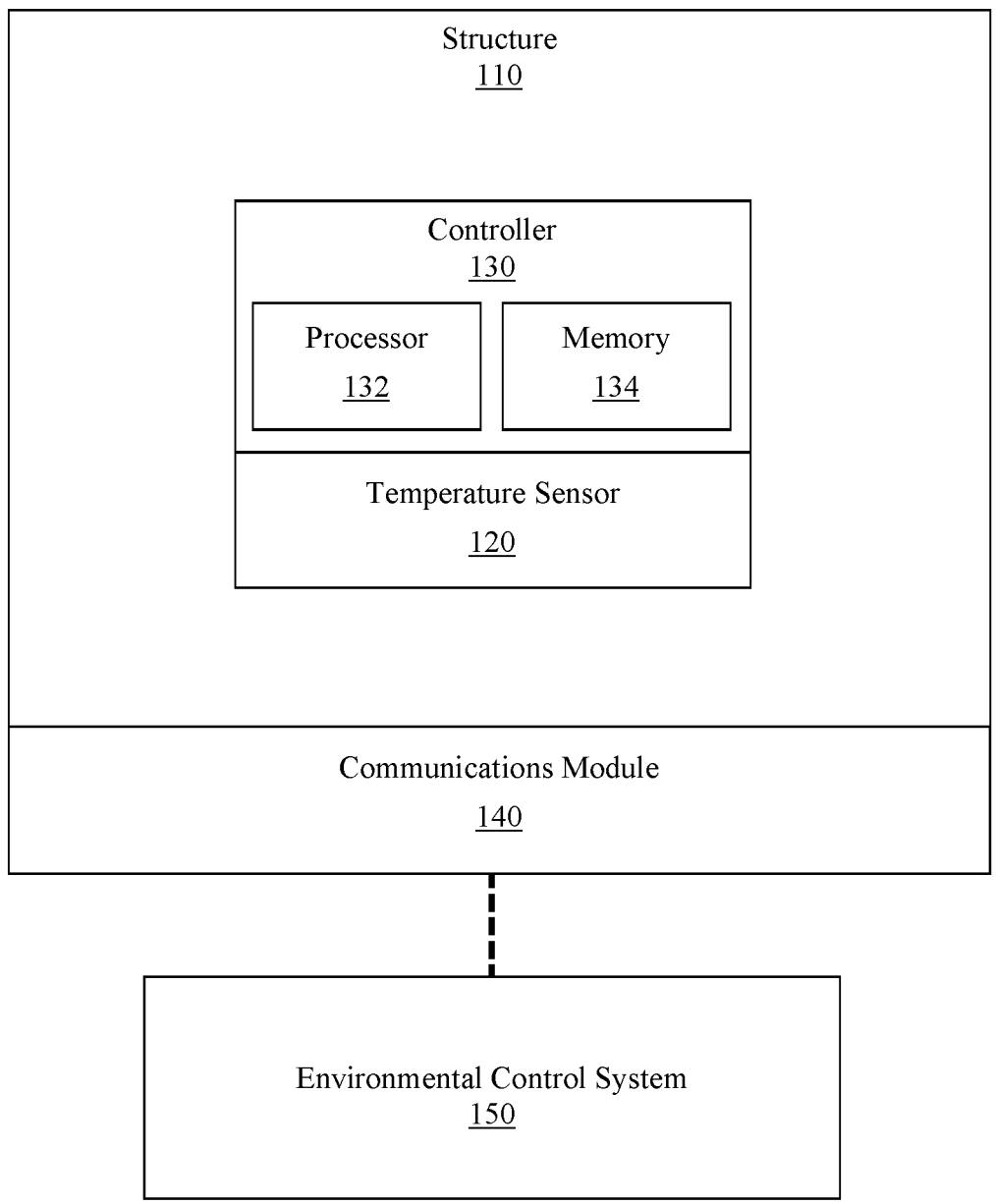
FIG. 1 is a schematic representation of a temperature measurement system, in accordance with an embodiment.

Referring to FIG. 1, in one embodiment, is a temperature sensing system 100. The temperature sensing system comprises a structure 110 with an associated or integrated one or more temperature sensors 120 and a controller 130. The system may optionally comprise an environmental control system 150 in communication with the temperature sensor and/or controller. Many other configurations and embodiments are possible.

The associated or integrated one or more temperature sensors 120 may be any sensor or element that obtains thermal information. As a non-limiting example, the temperature sensor 120 may be a non-radiative local-temperature sensor such as a thermocouple or thermistor, among other examples. The temperature sensor 120 may be located near, associated with, and/or integral to the structure 110. The structure 110 may be any component or structure within the environment. According to one embodiment, structure 110 is near, associated with, and/or integral to the upper space or ceiling of a room or similar environment. According to another embodiment, structure 110 is mounted on or within a wall, mounted in or on a piece of furniture or other object in the room, or located elsewhere within the space. For example, the structure 110 is a structure such as a luminaire, lighting component, speaker, screen, and/or any other component, electronic device, or structure that can generate heat or cold that affects the temperature of the system. For example, this temperature change may be a change in ambient air in the vicinity of the sensor, as well as the housing of the sensor, among other possibilities. In the case of a luminaire, as just one example, the driver electronics and the LEDs generate heat that warms up the materials of the housing, and the heat is transferred via conduction to the temperature sensor. Thus, even if there is no heat up of the sensor via the ambient air, as in the case of a wall-mounted luminaire where the hot air rises away from the sensor, the methods and systems described or otherwise envisioned herein will function to compensate for heat-up of the sensor itself.

According to another embodiment, the temperature sensor 120 may be integral to a sensor module or box 122 which may optionally contain one or more sensors in addition to the temperature sensor. For example, the sensor module may comprise sensor bundles using several sensing modalities to monitor space usage and environmental conditions. The sensor module may be integral to the structure, or may be located near the structure, or may be directly connected to or otherwise installed on the structure. The other sensing modalities of the sensor module may be anything that facilitates monitoring of a space, including but not limited to a light sensor, humidity sensor, pressure sensor, sound sensor, occupancy sensor, and/or any other sensor.

A temperature sensor 120 may obtain thermal information continuously and/or periodically. For example, a sensor may be configured or programmed to obtain thermal information at all times. The sensor may be configured to obtain thermal information at any frequency, such as once a second, once a minute, once every five minutes, one every 15 minutes, or any other interval. The frequency is not necessarily a fixed value, and can optionally be modifiable by a user or installer of the system. For example, the system may be configured or programmed to obtain thermal information at different frequencies throughout the day, week, or other timeframes. As an example, the thermal sensors can obtain thermal information at a higher frequency during the day when a space is more likely to be occupied and at a lower frequency during the night when a space is less likely to be occupied. The expected use of the space may also influence the frequency with which thermal information is obtained by the thermal sensors. For example, if the space is only used for meetings on Wednesdays, the system may be configured or programmed to obtain thermal information, and/or to obtain thermal information at a higher frequency, on Wednesdays around the time the meetings are held. The system may be integrated with a scheduling calendar to increase the thermal sensor activity during times when the space is scheduled to be utilized, and to limit or cease thermal sensor activity when the space is not scheduled to be utilized.

According to another embodiment, temperature sensor 120 may be configured to obtain thermal information, including at a particular rate or frequency, depending in whole or in part on the operation or mode of the structure 110 located near the sensor. For example, the temperature sensor 120 may be configured or controlled to obtain thermal information, and/or to adjust a parameter that affects how the thermal information is obtained, based on when the structure is turned off or on, and/or when a mode or other parameter of the structure is modified. The temperature sensor may be configured or controlled to begin obtaining and/or communicating thermal information when the structure is active and thus able to affect the temperature of the space. The temperature sensor may be configured or controlled to begin or stop obtaining and/or communicating thermal information when a parameter of the structure is adjusted.

In the case of a luminaire which generates heat and affects the local temperature of the space, thus affecting the temperature of the sensor 120 and/or the ambient temperature around the sensor, the sensor can be configured or controlled to obtain thermal information under specific guidelines. The sensor may obtain information continuously, or may begin obtaining information when the luminaire is turned on and stop obtaining information when the luminaire is turned off. The sensor may obtain information continuously or at a specific rate when the intensity of the luminaire is increased or decreased.

According to an embodiment, system 100 may comprise a wired or wireless communications module 140 configured to communicate the thermal information obtained from the one or more temperature sensors 120—and modified by the system as described in detail herein—to another portion of the system, to another structure 110, a sensor panel, and/or to an environmental control system 150. The environmental control system may be any system, program, or other control configured to manage or direct the environment of a space. Accordingly, a building or other structure may comprise multiple temperature sensors 120 each associated with a different structure, which communicate to a central structure 110, a central sensor panel, and/or to the environmental control system 150. For example, a building or other structure may comprise multiple structures in one or more rooms. An office building may comprise many rooms and offices, many or all of which may comprise one or more structures with one or more temperature sensors 120. Collecting and use of obtained temperature information from the structures may be on a room-by-room basis, a regional basis, a floor-by-floor basis, a building basis, and/or any other organizational structure.

The system and/or temperature sensors may be in wired connection to another portion of the system, the structure 110, the sensor panel, and/or to the environmental control system, or may communicate via a wireless protocol such as Wi-Fi, Bluetooth, IR, radio, near field communication, and/or any other protocol. The temperature sensors may be configured or programmed to continuously or periodically communicate information and the frequency may be adjusted based on a variety of factors including those discussed herein. The temperature sensors may also be configured or programmed to provide thermal information or other information in response to a query for information.

Controller 130 may comprise a processor 132 programmed using software to perform one or more of the various functions discussed herein, and can be utilized in combination with a memory 134. Memory 134 can store data, including one or more commands or software programs for execution by processor 132, as well as various types of data including but not limited to thermal information obtained by the temperature sensors, as well as any other information collected by any other sensors in the system. For example, the memory 134 may be a non-transitory computer readable storage medium that includes a set of instructions that are executable by processor 132, and which cause the system to execute one or more of the steps of the methods described herein.

System 100, particularly temperature sensor 120 and controller 130, also includes a source of power, most typically AC power, although other power sources are possible including DC power sources, solar-based power sources, or mechanical-based power sources, among others. The power source may be in operable communication with a power source converter that converts power received from an external power source to a form that is usable by the lighting unit. In order to provide power to the various components of the system, it can also include an AC/DC converter (e.g., rectifying circuit) that receives AC power from an external AC power source and converts it into direct current for purposes of powering the system's components. Additionally, the system can include an energy storage device, such as a rechargeable battery or capacitor, that is recharged via a connection to the AC/DC converter and can provide power to temperature sensor 120 and controller 130 when the circuit to AC power source is opened.

Figure 2:
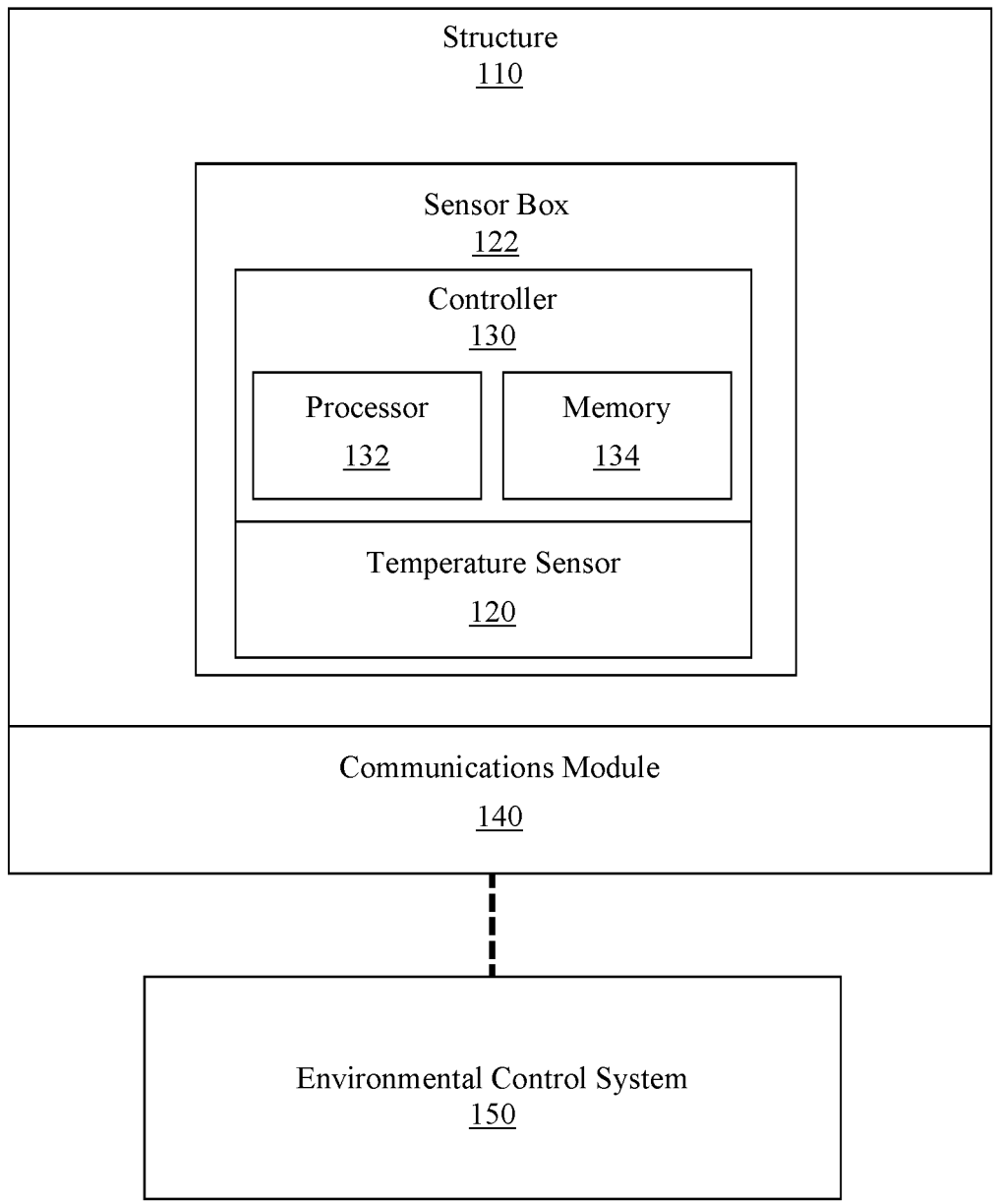
FIG. 2 is a schematic representation of a temperature measurement system, in accordance with an embodiment.
Figure 3:
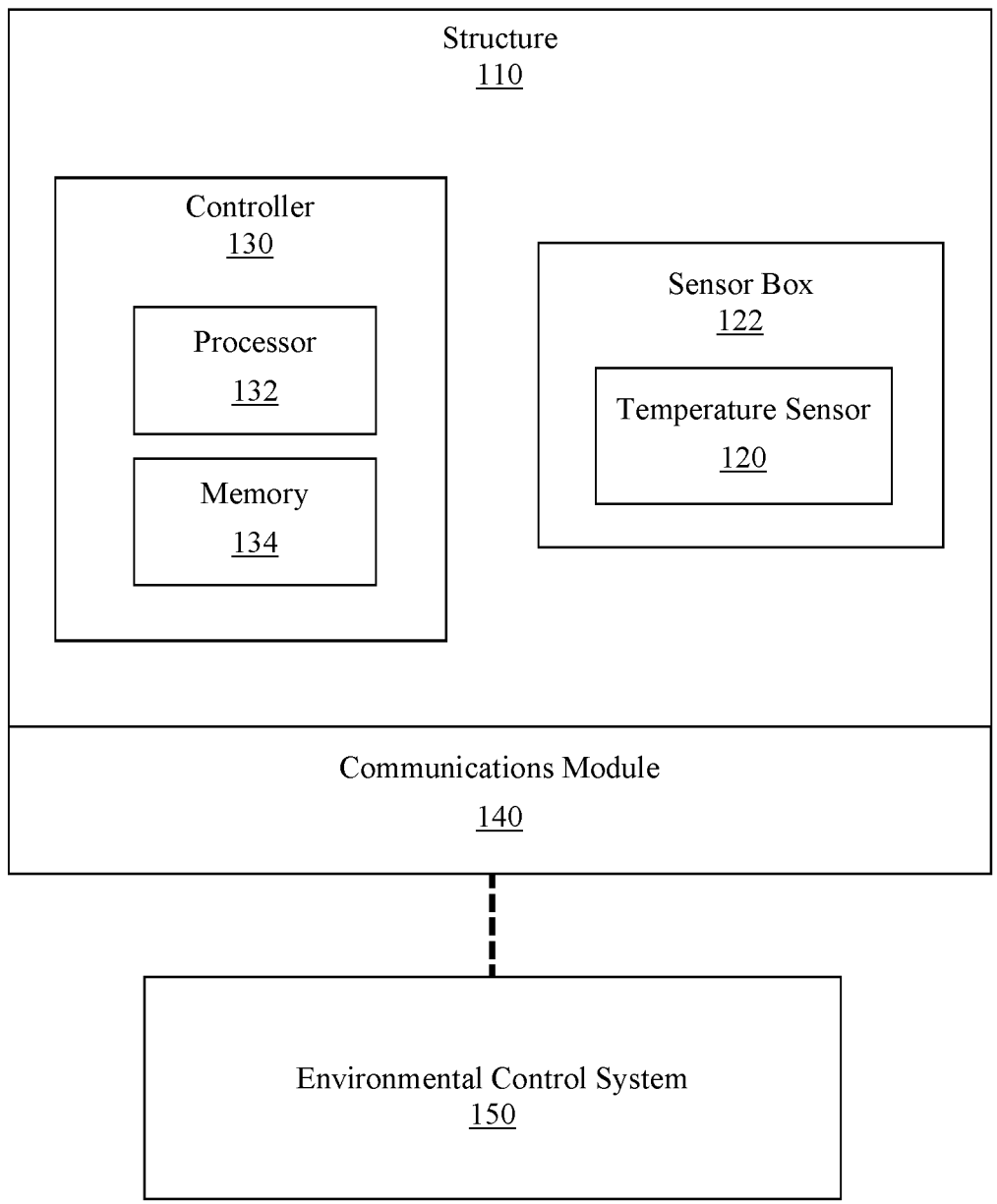
FIG. 3 is a schematic representation of a temperature measurement system, in accordance with an embodiment.
Figure 4:
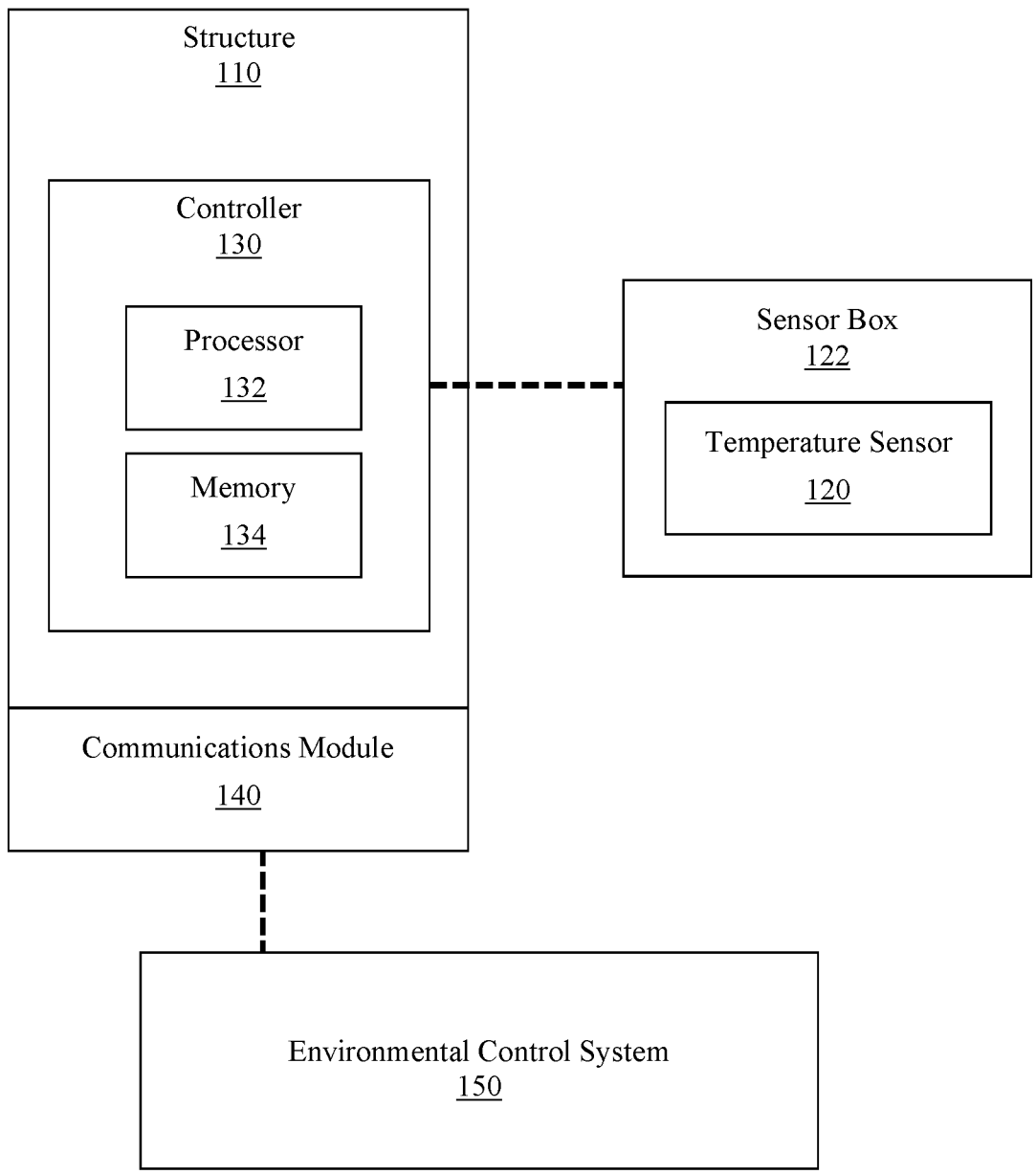
FIG. 4 is a schematic representation of a temperature measurement system, in accordance with an embodiment.
Figure 5:
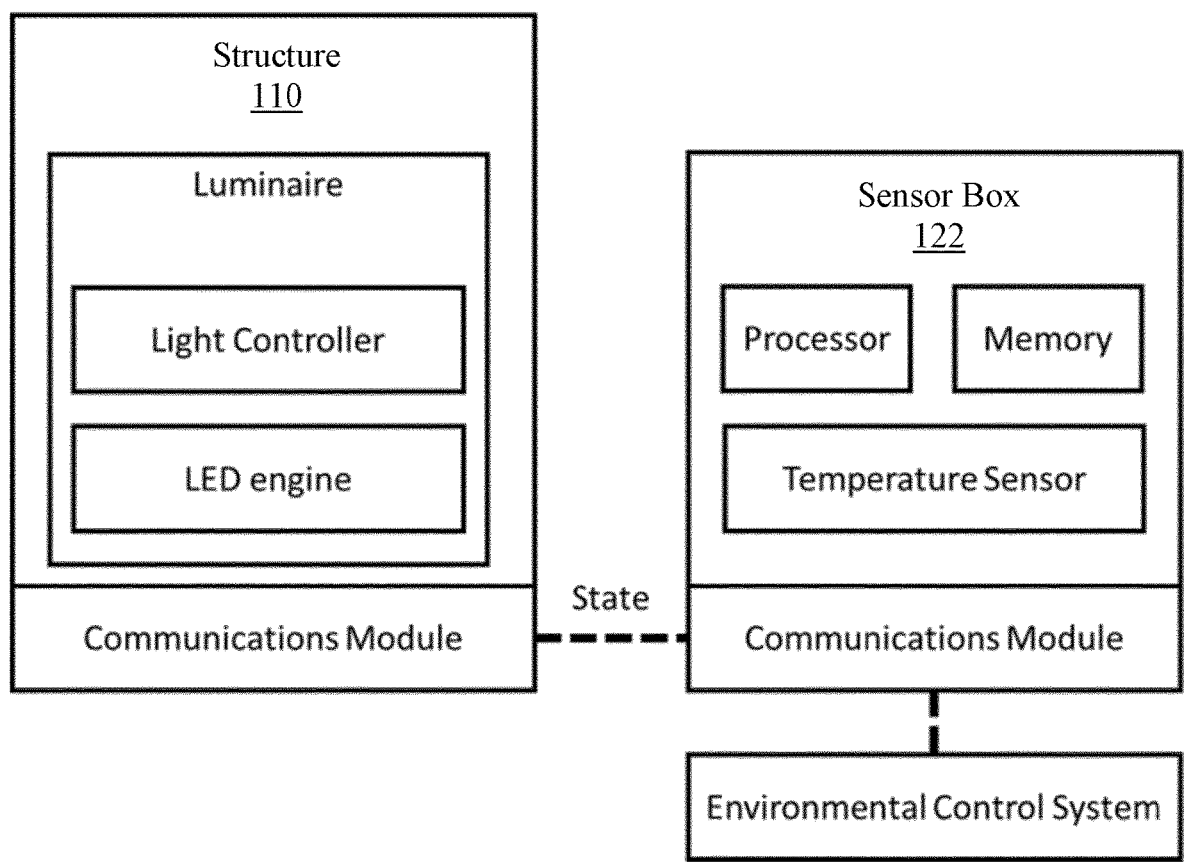
FIG. 5 is a schematic representation of a temperature measurement system, in accordance with an embodiment.
Figure 6:
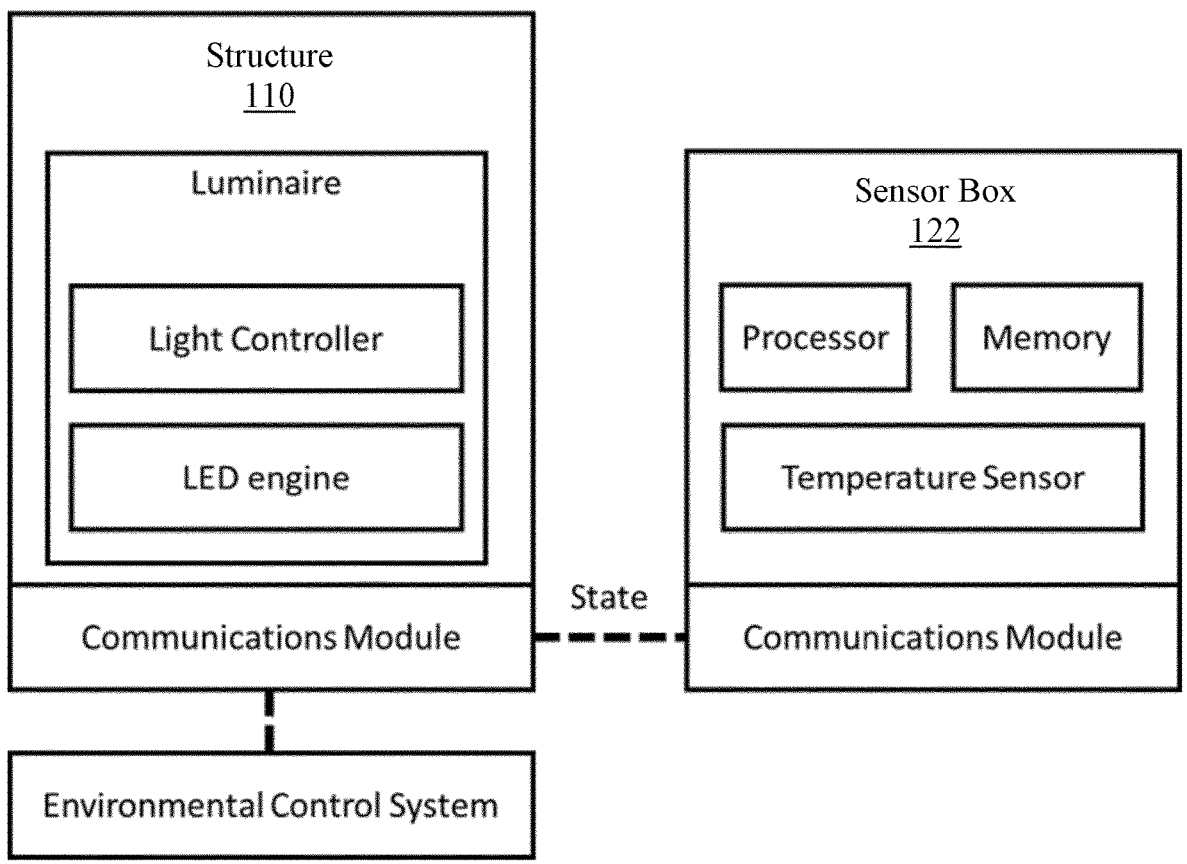
FIG. 6 is a schematic representation of a temperature measurement system within an environment, in accordance with an embodiment.

System 100 can comprise many different configurations. Referring to FIG. 1, for example, the system comprises a structure 110 such as a luminaire with a controller 130 and a temperature sensor 120 which is integral to or associated with the structure. Referring to another embodiment in FIG. 2, the system comprises a structure 110 with an integral sensor box 122, where the controller 130 and temperature sensor 120 are elements of the sensor box. In contrast, the embodiment in FIG. 3 the system comprises a structure 110 with a controller and an integral or associated sensor box 122 with a temperature sensor 120. Referring to the embodiment depicted in FIG. 4, for example, the system comprises a structure 110 and further comprises a temperature sensor 120 (with or without a sensor box 122) in communication with the structure. The temperature sensor 120 (alone or via sensor box 122) may be in wired and/or wireless communication with the structure, even if the temperature sensor and/or sensor box is attached to or integral to the structure. Referring to yet another embodiment depicted in FIG. 5, the system comprises a structure 110 and further comprises a temperature sensor 120 (with or without a sensor box 122) in communication with both the structure and the environmental control system. In the embodiment depicted in FIG. 6, the system comprises a structure 110 and further comprises a temperature sensor 120 (with or without a sensor box 122). In addition to these non-limiting examples, many other embodiments and configurations are possible.

Figure 7:
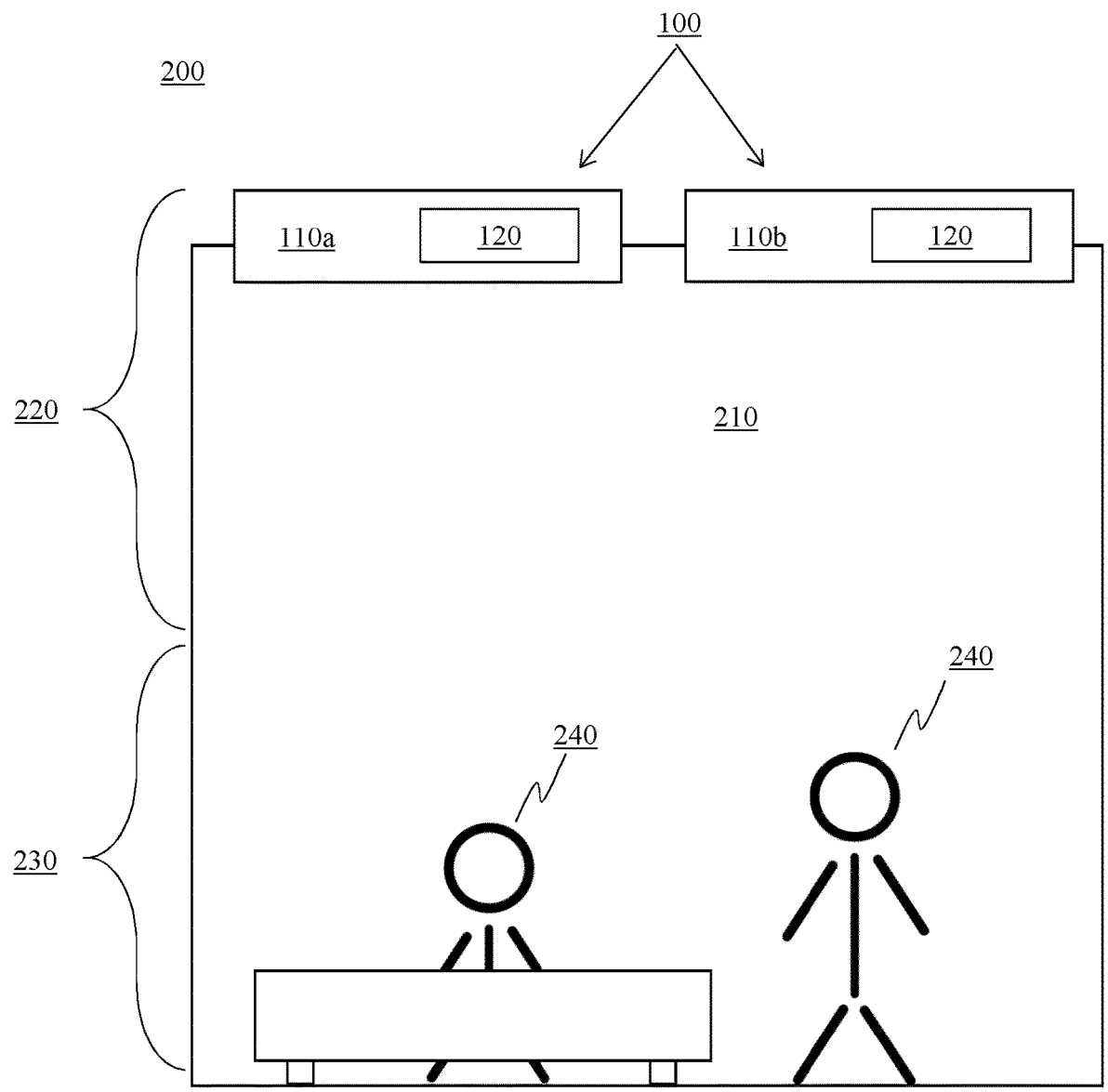
FIG. 7 is a schematic representation of a temperature measurement system within an environment, in accordance with an embodiment.

Referring to FIG. 7, in one embodiment, is an environment 200 which includes a temperature sensing system 100. In this example, the temperature sensing system 100 comprises two ceiling structures 110a and 110b, each of which has a respective one or more temperature sensor 120. The ceiling structures can be any structure located near, within, or otherwise at the upper portion 220 of the space 210. For example, the ceiling structures may be luminaires or other structures. There may be an optimal placement of a ceiling structure and/or sensor, for example, which may depend upon numerous factors such as the size and shape of environment 200. For example, a sensor may be positioned to allow for the entire environment 200 to be analyzed by one or more sensors, and this will be informed at least in part on the size and/or shape of the environment. A sensor may also be positioned to only analyze a portion of environment 200. This configuration can be predetermined using maps, blueprints, or other information about the environment, or can be determined during installation and/or testing of the system. The configuration can later be modified or adjusted, for example, if the original placement is determined to be less than optimal, or if the use of the room changes over time.

The space 210 may be any space for which temperature monitoring and/or regulation is desired or required, such as an office, hall, bathroom, closet, conference room, and/or any other room or space. The space comprises an upper portion 220 which is in the upper region of the space 210. Although shown as approximately half of the space 210, the upper portion may be taller or shorter than the region shown in FIG. 7. The space comprises a lower portion 230 which is in the lower region of the space 210. Although shown as approximately half of the space 210, the lower portion may be taller or shorter than the region shown in FIG. 7. However, space 230 typically comprises the region for which accurate temperature monitoring and/or regulation is required or desired. Thus, space or region 230 typically comprises the occupant space and may include desks, chairs, beds, and/or other furniture or structures. As shown in FIG. 7, environment 200 currently comprises a desk and two occupants 240.

Figure 8:
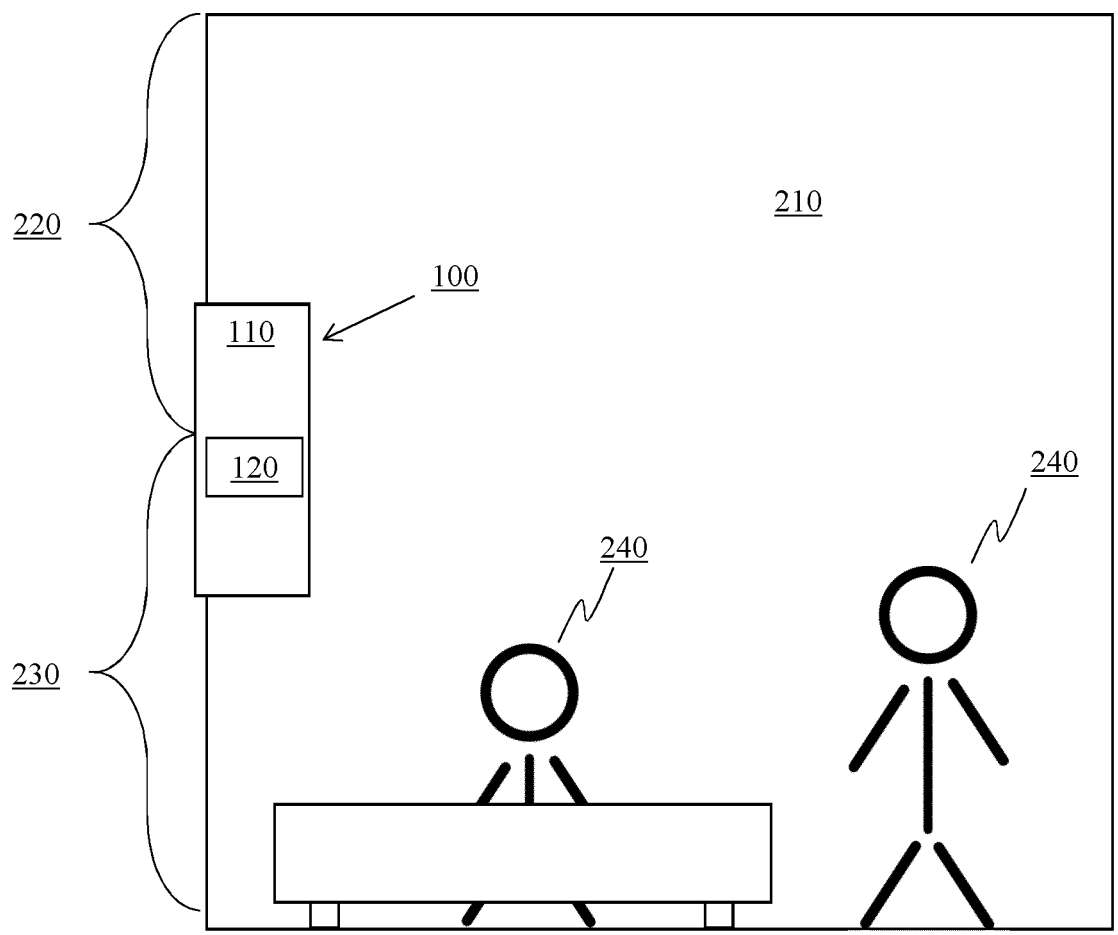
FIG. 8 is a schematic representation of a temperature measurement system within an environment, in accordance with an embodiment.
Figure 9:
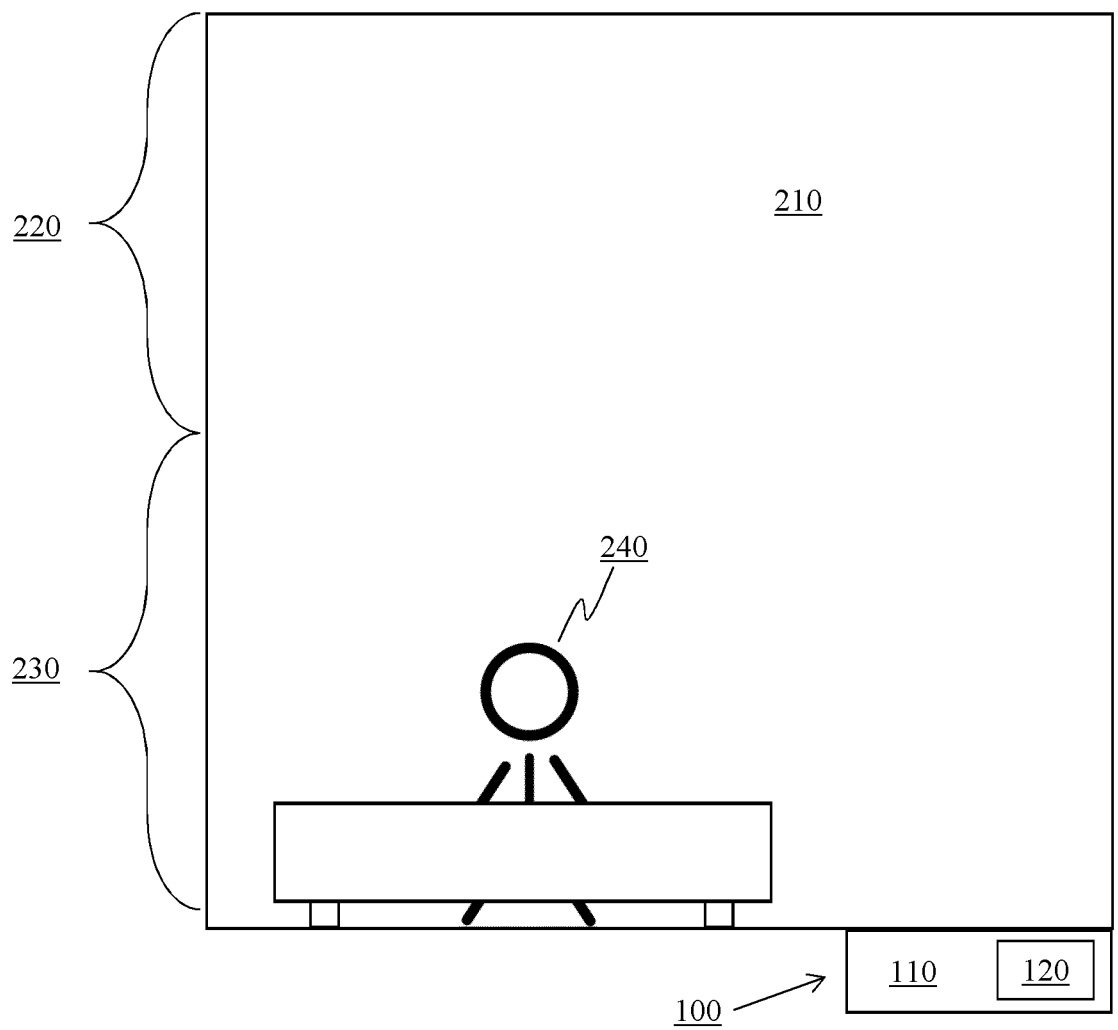
FIG. 9 is a schematic representation of a temperature measurement system within an environment, in accordance with an embodiment.
Figure 10:
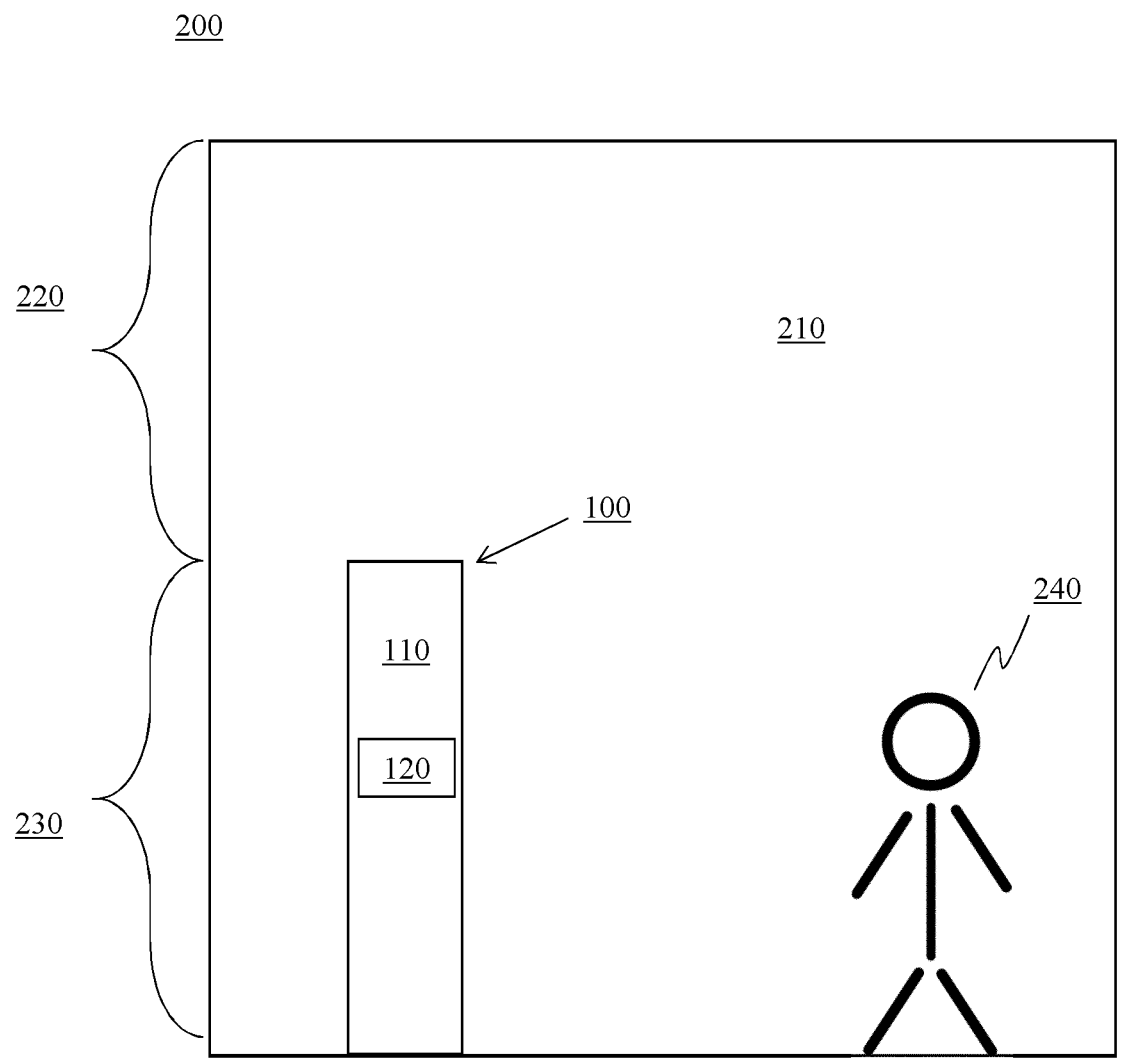
FIG. 10 is a schematic representation of a temperature measurement system within an environment, in accordance with an embodiment.

Referring to FIG. 8 is an environment 200 which includes a temperature sensing system 100. In this example, the temperature sensing system 100 comprises a wall-mounted structure 110 which has one or more temperature sensors 120. The wall-mounted structure can be any structure located near, within, or otherwise associated with the wall or other portion of the environment. Similarly, Referring to FIG. 9 is an environment 200 which includes a temperature sensing system 100. In this example, the temperature sensing system 100 comprises a floor-mounted or floor-embedded structure 110 which has one or more temperature sensors 120. The floor-mounted or floor-embedded structure can be any structure located near, within, or otherwise associated with the wall or other portion of the environment. As another non-limited example, referring to FIG. 10 is an environment 200 which includes a temperature sensing system 100. In this example, the temperature sensing system 100 comprises a structure 110 which has one or more temperature sensors 120. The floor-mounted or floor-embedded structure can be any structure located near, within, or otherwise associated with the wall or other portion of the environment.

Figure 11:
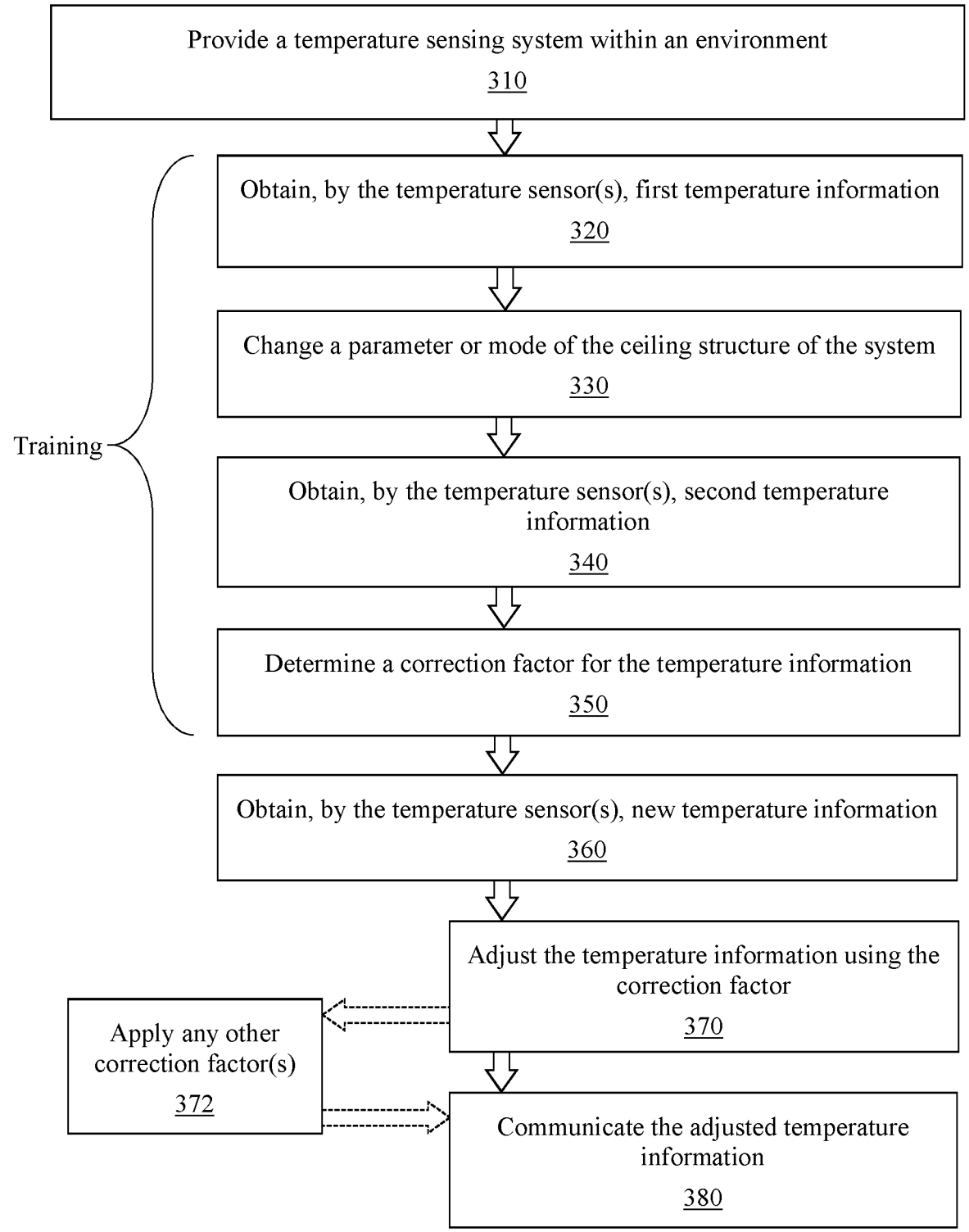
FIG. 11 is a flowchart of a method for temperature sensing, in accordance with an embodiment.

Referring to FIG. 11, in one embodiment, is a flowchart illustrating a method 300 for detecting occupant-level air temperature of a space using one or more temperature sensors. At step 310 of the method, a temperature sensing system 100 is provided within an environment 200. The temperature sensing system can be any of the embodiments described herein or otherwise envisioned, and can include any of the components of the systems described in conjunction with FIGS. 1-10, for example, such as structure 110 with an associated or integrated one or more temperature sensors 120 and a controller 130, among other elements. The environment can be any environment described herein or otherwise envisioned. The temperature sensing system 100 is installed with, or is modified to include, the one or more temperature sensors 120 and a controller 130.

The temperature sensing system 100 is trained upon installation, and/or periodically, to produce temperature correction comprising an effect of an operating mode of the structure 110 on the temperature sensor. This training may comprise many different training parameters. According to one embodiment, the system is trained during a period when the temperature is determined, meaning the temperature is relatively stable or otherwise known, extrapolated or well-characterized. For example, the training may occur when the environment 200 is unoccupied and/or unlikely to be affected by heat sources such as sunlight, such as overnight or on the weekends. Alternatively, the temperature of the space can be detected during this calibration period using other sensors such as an adjacent sensor in an adjacent luminaire, among others. As yet another example, the system can extrapolate the temperature change over the calibration period given start/end temperatures. These and other approaches may be utilized to create a determined temperature that can be used during calibration.

According to an embodiment, "operating mode" can mean any change in the structure. As just one example when the structure is a luminaire, an operating mode may comprise an inactive or dormant mode where the lighting unit of the luminaire is turned off, or may comprise an active mode where the lighting unit of the luminaire is turned on. As another example, the operating mode may comprise any general operating parameter of the structure. As other examples, a change in an operating mode may be any step, impulse, ramp, sinusoid, square wave, and/or any other adjustment of an operating parameter of the structure.

At step 320 of the method, one or more temperature sensors 120 of the system obtain first temperature information from a region 220 or 230 of the environment while the temperature of environment 200 is determined, meaning that the temperature is stable or otherwise known, extrapolated, or well-characterized. The one or more temperature sensors 120 may periodically or continuously obtain temperature information but only information obtained during key times may be utilized, and/or the one or more temperature sensors 120 may be directed to obtain temperature information. The system may communicate the obtained temperature information, and/or may store the temperature information such as in memory 134.

The structure 110 is in a first operating mode while the first temperature information is obtained. As just one example when the structure is a luminaire, the first mode may comprise an inactive or dormant mode where the lighting unit of the luminaire is turned off. Accordingly, the luminaire is not generating heat and shouldn't affect the temperature readings. Thus, the temperature readings obtained by the one or more temperature sensors 120 should approximately represent the actual temperature of region 220 rather than a temperature which is elevated by the structure. However, the temperature measured by the one or more temperature sensors 120 might not be exactly equal to the air temperature in region 220 or 230, because other electronics like a microprocessor associated with the sensor—which remain switched on even if the structure itself is switched off and not producing light—could generate heat that slightly elevates the temperature of the one or more temperature sensors 120 and the air immediately surrounding these sensors. A 'self-heating' temperature offset might therefore need to be subtracted to create a better approximation of the air temperature in region 220.

At step 330 of the method, the structure 110 is adjusted or modified from the first operating mode to a second operating mode. As just one example when the structure is a luminaire, the second mode may comprise an active mode where the lighting unit of the luminaire is turned on. Accordingly, the luminaire will generate heat and could affect the temperature readings. Thus, the temperature readings obtained by the one or more temperature sensors 120 will represent the temperature of region 220 or 230 as affected by the structure. Alternatively, the first operating mode is an active mode and the second operating mode is a dormant mode.

According to an embodiment, to obtain (an estimate of) the temperature of region 230, the level most representative of how humans will experience the space, the system must account for the vertical stratification of the air temperature which can happen between regions 230 and 220, due to the tendency of warmer air to rise. The typical stratification in a room in an office building, with a ceiling height of about 3 meters, is between 0.5 and 1 degree Celsius. The level of stratification is usually higher if the room is in use, such as if people, or objects such as switched-on computers that heat up the air in the room, are present. Therefore, according to an embodiment, the system envisages that in order to obtain (the estimate of) the temperature of region 230 a stratification factor is estimated and subtracted from the temperature estimate of region 220. This stratification factor estimation may be done once at the time that the system is configured, or alternatively more dynamic methods of obtaining stratification factor estimates could be used.

According to another embodiment, one or more of the first and second operating modes represent a modification of a parameter of the structure 110. As just one example when the structure is a luminaire, an operating mode may represent dimming or another change in heat dissipation.

At step 340 of the method, the one or more temperature sensors 120 of the system obtain second temperature information from the region 220/230 of the environment while the temperature of environment 200 is determined, meaning that the temperature is stable, extrapolated, or otherwise known or well-characterized, and while the structure 110 is operating in the second operating mode. The one or more temperature sensors 120 may periodically or continuously obtain temperature information but only information obtained during key times may be utilized, and/or the one or more temperature sensors 120 may be directed to obtain temperature information. The system may communicate the obtained temperature information, and/or may store the temperature information such as in memory 134.

At step 350 of the method, the controller 130 determines a temperature correction using at least the first temperature information and second temperature information obtained from the region 220/230 of the environment. This conversion comprises an effect of the second operating mode of the structure 110 on the one or more temperature sensors 120. This conversion can be utilized in future temperature measurements, while the structure is operating in the first or second operating mode, to factor in the effect of the first or second operating mode on the measurements.

Figure 12:
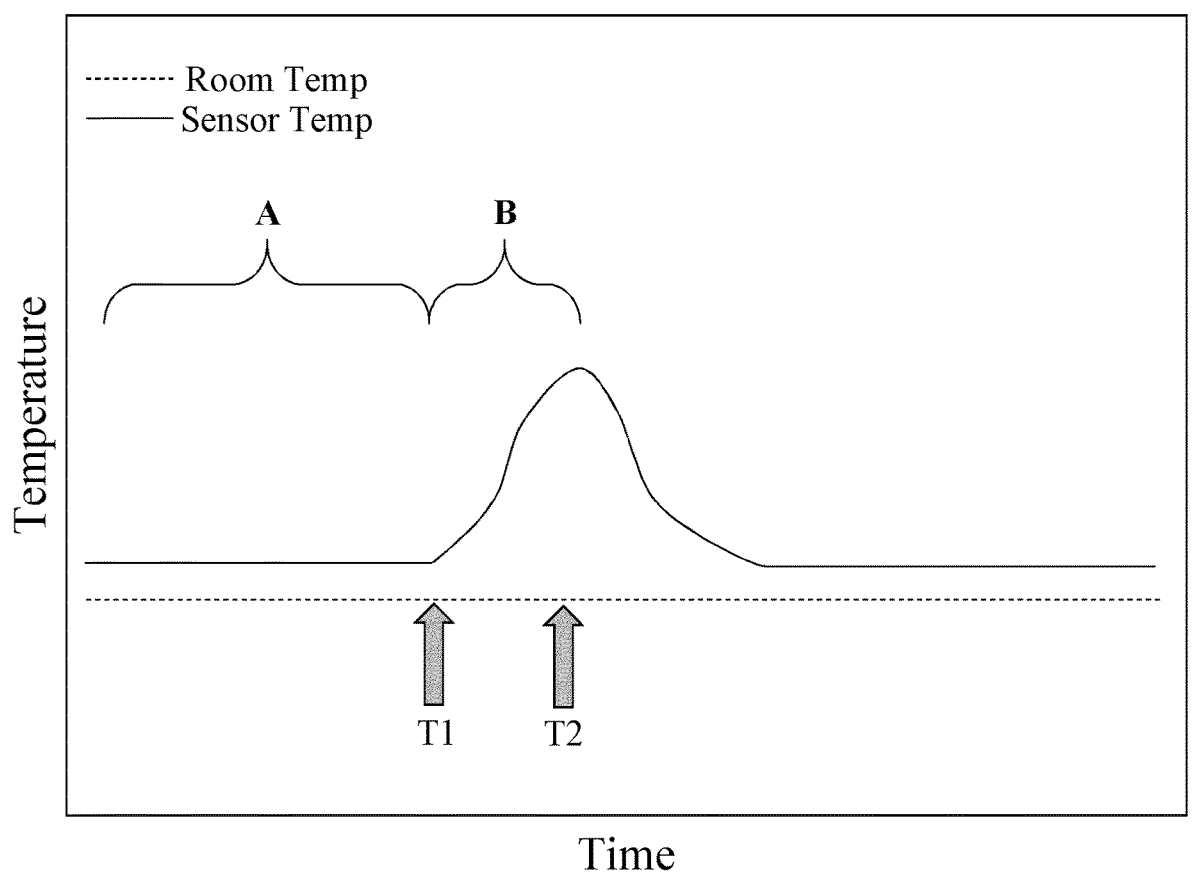
FIG. 12 is a graph of a temperature sensing method, in accordance with an embodiment.

Referring to FIG. 12 is a graph of an embodiment of a process comprising steps 320 through 340 of the method described or otherwise envisioned herein. In this figure, as shown by the room temperature measurements ("Room Temp"), the temperature of environment 200 is stable during the relevant time period ("Time"). Under the assumption that the temperature of the environment remains stable, the correction factor can be computed as described below. If the Room Temp could vary significantly over the time period, the computation of the correction factor must also utilize an estimate of how the temperature varied.

The one or more temperature sensors 120 in a structure 110, such as temperature sensors in a luminaire, may obtain data continuously or periodically during the relevant time period. At step 320 of the method, the system obtains first temperature measurements during period A while the structure 110 is in a first operating mode. For example, the first operating mode may be in an inactive mode during period A.

At time T1, which may correspond to step 330 of the method, the operating mode of the structure 110 is changed to a second operating mode. For example, the second operating mode may be an active mode during period B. Alternatively, the second mode may represent any change in the operation of structure 110 relative to the first operating mode. For example, any of the first, second, or other operating modes may comprise dimming steps, impulses, ramps, sinusoids, square waves, and/or any other operating mode.

During period B, which may correspond to step 340 of the method, the system obtains second temperature measurements while the structure 110 is in the second operating mode. According to one embodiment, the system obtains second temperature measurements until asymptotic temperature stability. Optionally, at time T2, the structure 110 can be changed to a different operating mode, which may be the first operating mode or any other operating mode different from the second operating mode. The system may continue to collect temperature information using the one or more temperature sensors 120, or may collect such temperature information during any other time period.

The system uses the temperature readings obtained during period A and period B (and/or any other period) to determine the temperature correction comprising an effect of the second operating mode of the structure 110 on the one or more temperature sensors 120.

Figure 13:
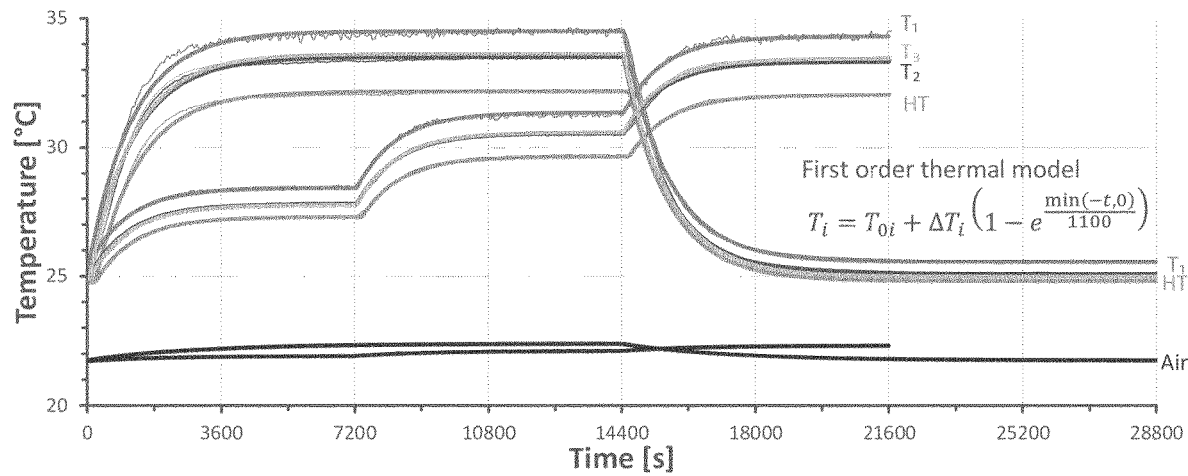
FIG. 13 is a graph of temperature measurements inside a sensor box, in accordance with an embodiment.

The temperature correction may be determined in a variety of different ways, in addition to the methods described or otherwise envisioned herein. According to one embodiment, determining a temperature correction comprises approximating the measured system response by creation of a look-up table, curve fitting, and/or parameter estimation of a thermal model, preferably first order, followed by correcting for the difference between the initial and final temperature. For example, referring to FIG. 13 in one embodiment, is a graph of temperature measurements (thin lines) inside a sensor box in a luminaire upon 100%-67%-33% dimming steps with first order model fits (thick lines). A first order model may be generated, for example, using the following equation:

$$T_i = T_{0i} + \Delta T_i \left(1 - e^{\frac{min(-t,0)}{1100}}\right) \quad \text{(Eq. 1)}$$

For example, the system can convolute the system response, determined by the temperature measurements, with the communicated dimming evolution of the structure 110. This can be performed in a sensor box, the temperature sensor, the controller, and/or the structure depending on the design of the system. Alternatively, the system can determine the correction in the cloud or at another remote location such as a central location of the building.

With a generated first order thermal model, subsequent temperatures measured by the temperature sensor(s) are corrected using the convolution, and/or using a low-pass filter or process, to obtain the room air temperature. This can be performed in a sensor box, the temperature sensor, the controller, and/or the structure depending on the design of the system. Alternatively, the system can perform the correction in the cloud or at another remote location such as a central location of the building.

According to an embodiment, in order to obtain compensation parameters, a machine learning algorithm can measure the temperature response of >1 internal local-temperature sensor to >1 dimming step/impulse/ramp/sinusoid/square wave. The algorithm can take into account that the response is influenced also by changes in the air temperature in the room. These air temperature changes may be measured by another sensor, located in a structure that stays switched off (i.e. stays in the same operating mode throughout the time period), located in the same room. This reference reading can be subtracted to get a clean curve. An alternative approach, not requiring a reference sensor, is to do statistical averaging over many test cycles. Machine learning can also be used to determine the self-heating of the sensor or structure. This can be done by triggering a structure power consumption step/impulse/square wave, measuring the response of the >1 internal local-temperature sensor, and convoluting with the power evolution or extrapolating the temperature measurements to a power consumption level of zero.

Returning to FIG. 11 and method 300, at step 360 of the method the system obtains new temperature information from the temperature sensor after determining a temperature correction. This can be at any time point or period following the creation of the temperature correction. These temperature readings will be corrected using the generated temperature correction.

Accordingly, at step 370 of the method, the system adjusts the temperature information using the temperature correction. The adjustment can be performed immediately or using stored data. The adjustment can be performed by the temperature sensor, a sensor module or box, the structure, and/or by a central unit of the system, including but not limited to the environmental control system.

At optional step 372 of the method, the system applies one or more other corrections. As just one example, the system may apply a stratification factor to the temperature, although other corrections are possible.

At step 380 of the method, the system provides adjusted temperature measurements to another controller. For example, the system may provide adjusted temperature measurements to another structure and/or a central unit of the system, including but not limited to the environmental control system. As just one example, adjusted temperature measurements may be generated by a luminaire and provided to neighboring luminaires and/or to an environmental control system, among other possibilities.

Figure 14:
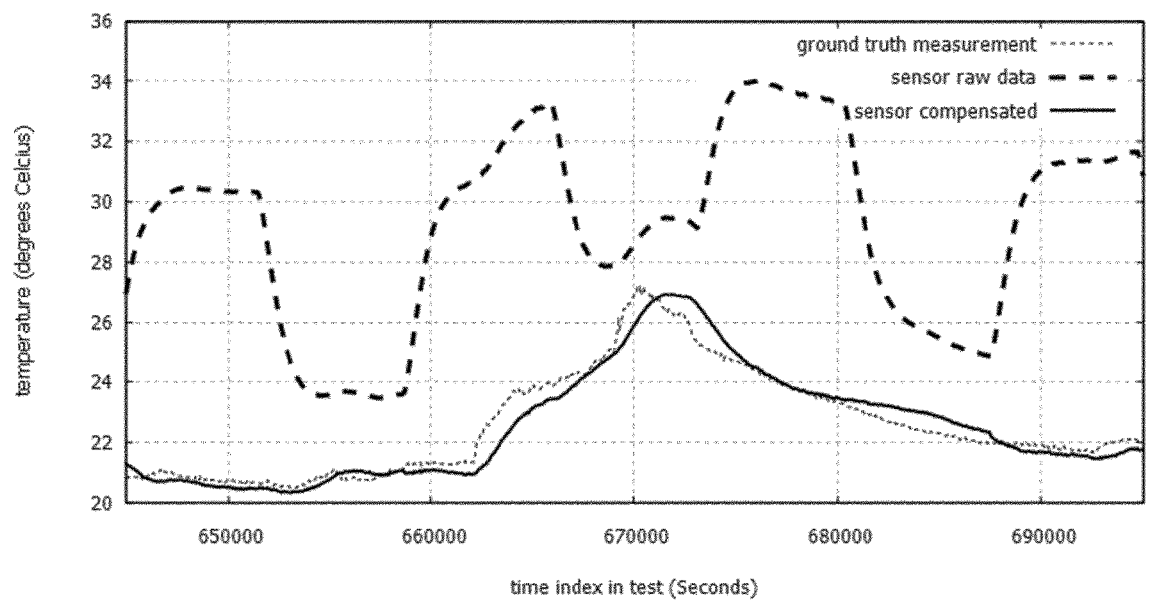
FIG. 14 is a graph of temperature measurements inside a sensor box, in accordance with an embodiment.

Referring to FIG. 14, in one embodiment, is a graph of temperature measurements from a temperature sensor 120 located within a sensor box installed on a luminaire located within a meeting room. During the time period shown in the graph, the luminaire underwent several modifications in operating mode.

The ground truth measurement curve in FIG. 14 represents the air temperature at 1.2 meters above the floor, measured by averaging four air temperature sensors placed directly under the luminaire, each underneath one corner of the luminaire. This measurement represents the temperature most relevant to people in the room, and is loosely based on the methodology of section 7.3 of ANSI/ASHRAE Standard 55-2013.

The sensor raw data curve in FIG. 14 represents the air temperature raw data from the sensor in the luminaire. As shown, the curve is heavily influenced by the luminaire switching on and off, as the luminaire switches several times during the test interval shown. This curve always stays above the ground truth, even when the luminaire is off, because the sensor electronics self-heat, making the temperature sensor warmer than the air in the room even if the luminaire is off.

The sensor compensated curve in FIG. 14 represents the corrected temperature calculated using the correction model disclosed or otherwise envisioned herein. As shown by the graph, the correction model significantly modifies and improves the temperature sensing ability of the sensor.

Additionally, since a system must have an accurate estimate of the air temperature at 1.2 meters above floor level in order to accurately measure and report the relative humidity as experienced by people in the room, relative humidity readings from a relative humidity sensor in the structure, a humidity sensor surrounded by air that is hotter than the air at 1.2 meters, will not equal the relative humidity of the (cooler) air at 1.2 meters above floor level. Accordingly, the methods and systems described herein can improve the accuracy of humidity sensors located at the structure, including in a sensor box.

According to another embodiment, the sensor or a sensor box itself also produces heat that can affect the temperature readings in addition to the effect from the structure. For example, although the structure may act as a heat sink that draws heat generated by the sensor or sensor box, individual sensors or sensor boxes may act differently thus requiring a specific measurement and accounting for the impact of the sensors or sensor boxes. Accordingly, the system may comprise a method or system that uses an automatic machine learning step to determine one or more heat-up compensation parameters. Among those parameters are: (i) the self-heat-up level for the sensor or sensor box; (ii) the sensor or sensor box heat-up level when the structure is switched on (which represents the difference between 0% and 100% dimming level); (iii) the slope and shape of a heat-up transition curve when the structure is switched on; and (iv) the slope and shape of a cool-down transition curve when the structure is switched off. These parameters are utilized, together with knowledge of the dim level or other change to the structure, to construct a compensation curve that is subtracted from the reading of the sensor in order to obtain the corrected air temperature.

To obtain test data, a machine learning system was implemented that obtained the parameters while triggering a single dimming cycle overnight to minimize disturbances due to changing thermal stratification and other disturbing room temperature variations. The test comprised a sensor module on the end of a pole, located about four meters away from the sensor module being calibrated, as a reference sensor. To determine the self-heating of the sensor module being calibrated, the field-tested measurements completely cut off power to the electronics in the sensor module being calibrated for a few hours, allowing it to equalize with the room temperature, and then measured the step response of the temperature upon switching on the sensor module again.

Figure 15:
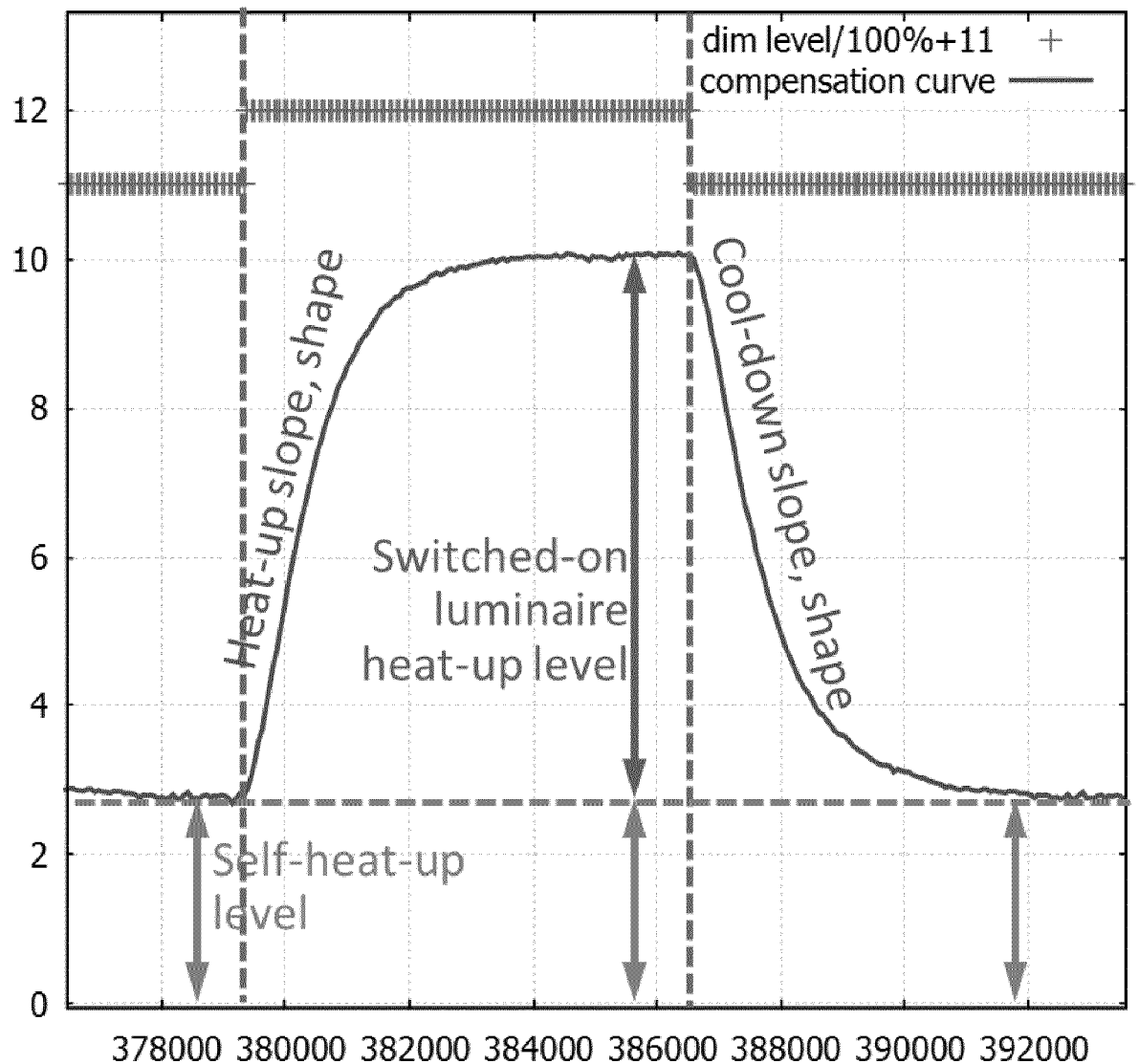
FIG. 15 is a graph of a compensation curve for heating of a sensor box, in accordance with an embodiment.

Referring to FIG. 15, in one embodiment, is a graph generating a compensation curve where the X axis is a time index in seconds for dim level and compensation curve values, and the Y axis is a dim level state and compensation value in degrees Celsius. The graph shows the 'self-heat-up level' for the sensor or sensor box, the 'switched-on luminaire heat-up level' when the structure is switched on (which represents the difference between 0% and 100% dimming level), the slope and shape of a heat-up transition curve ('Heat-up slope, shape') when the structure is switched on, and the slope and shape of a cool-down transition curve ('Cool-down slope, shape') when the structure is switched off. The graph shows the compensation curve which can be used to subtract from the Tsens reading to obtain the air temperature.

According to an embodiment, the heat-up and cool-down transition curves represented processes that could be modeled and approximated using an exponential function. For example, if the luminaire is switched on at t=t0, the heat-up curve can be approximated using the equation:

$$\text{level}*(1-\exp(\text{speed}*(t0-t))) \quad \text{(Eq. 2)}$$

where level is the switched-on luminaire heat-up level and speed is a heat-up speed parameter.

Figure 16:
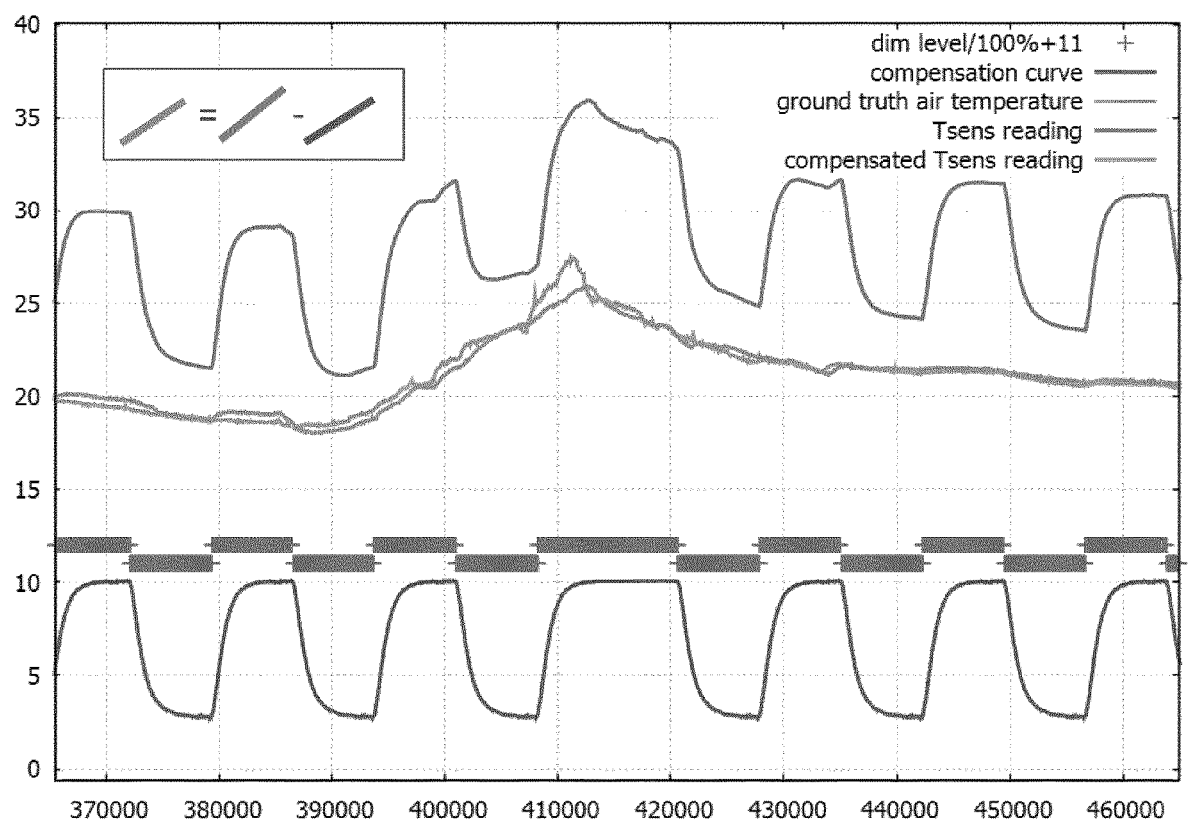
FIG. 16 is a graph using a compensation curve for heating of a sensor box, in accordance with an embodiment.

Referring to FIG. 16, in one embodiment, is a graph depicting the compensation curve at work. The compensation curve at the bottom of the graph is constructed using the dim level (located just above the compensation curve) and the compensation parameters. The compensated temperature reading is computed by subtracting the compensation curve from the Tsens reading (at the top of the graph). The ground truth air temperature at 1.2 meters under the luminaire is shown for reference and very closely mirrors the compensated temperature reading.

The system must take into account that that the sampled curve is also influenced by changes in the air temperature in the room. According to an embodiment, one possible solution is to measure these air temperature changes using another sensor, located in a luminaire that stays switched off, located in the same room. This reference reading is subtracted to get a clean curve. An alternative approach, not requiring a reference sensor, is to do statistical averaging over many test cycles. Such an approach would use data captured over a long time, to filter away 'noise' effects caused by human occupancy. An alternative leaning approach, that uses the switch-on and switch-off events that occur naturally while the building is occupied, might also be possible. A hybrid learning approach that combines both triggered cycles and learning during occupancy could also be utilized. Machine learning can also be used to determine the self-heat-up level (yellow) of the sensor. This can be done by varying the sensor power consumption in a known way, measuring the effect on the Tsens reading, and then extrapolating this temperature to a power consumption level of zero.

Figure 17:
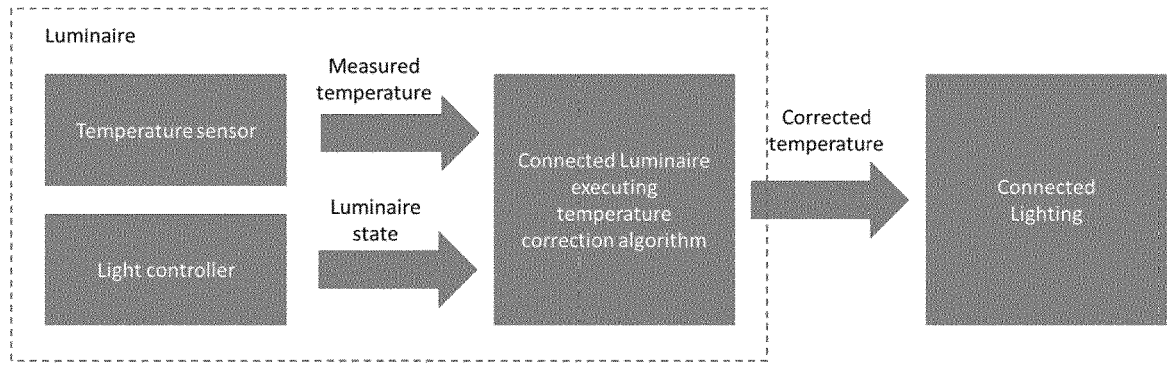
FIG. 17 is a schematic representation of the generation and application of a temperature correction model, in accordance with an embodiment.
Figure 18:
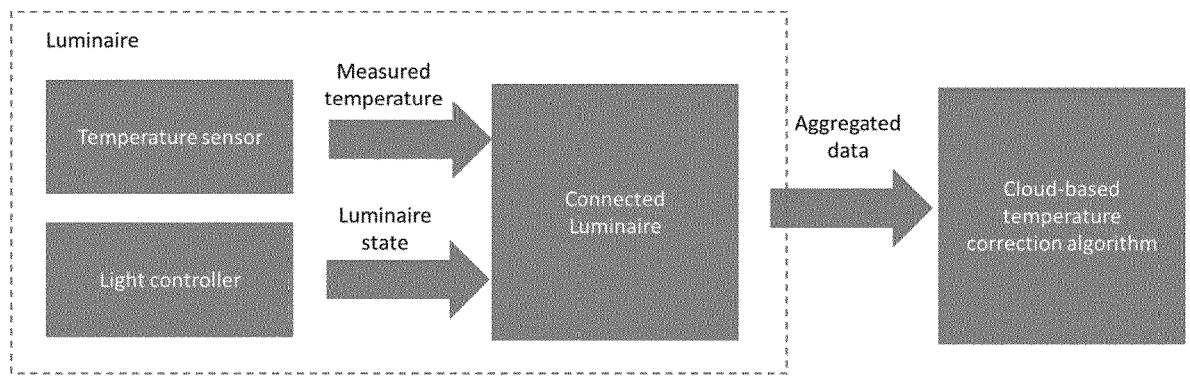
FIG. 18 is a schematic representation of the generation and application of a temperature correction model, in accordance with an embodiment.

Referring to FIGS. 15 and 16, in various embodiments, are example applications of a temperature correction model according to the methods and systems described or otherwise envisioned herein. The raw internal local-temperature measurements can be corrected by the sensor bundle or via cloud-analytics based on the dimming evolution and the temperature response of the luminaire. For example, in FIG. 17, a connected luminaire ("Luminaire") corrects the raw temperature readings using the temperature correction before transferring temperature data to the connected lighting infrastructure. In FIG. 18 the connected luminaire transfers the raw temperature readings to the connected lighting infrastructure that corrects the temperature data using the temperature correction. Many other configurations are possible. One advantage of cloud-based and similar solutions is that the model can be refined over time with more collected data. Additionally, information from neighboring or other similar luminaires can be used to improve the thermal correction model.

Figure 19:
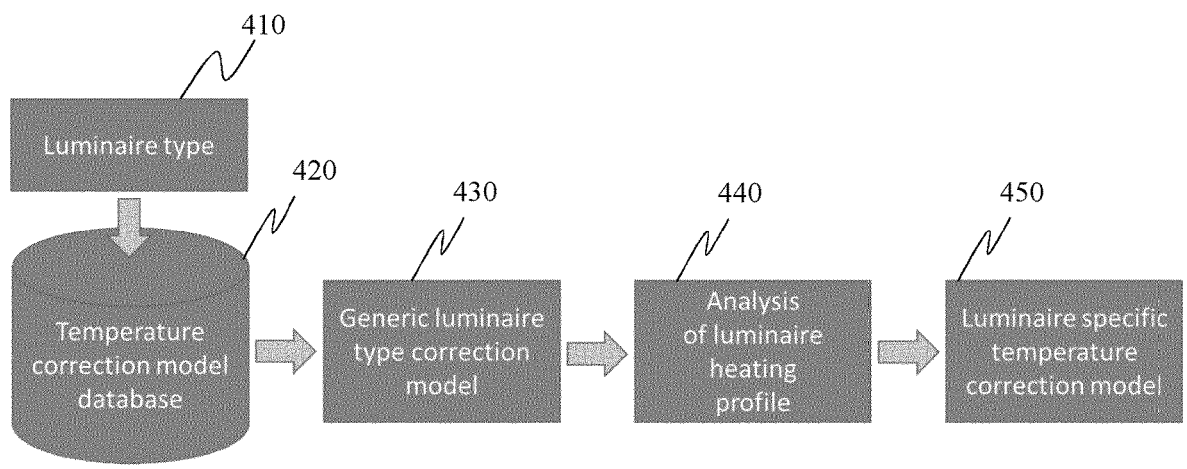
FIG. 19 is a schematic representation of the generation and application of a temperature correction model, in accordance with an embodiment.

According to another embodiment depicted in FIG. 19, the system may download a generic thermal correction model as a starting point for adaptation to the location dependent operating condition. Thus, the thermal correction model need not be built entirely from scratch, instead having a starting point.

For example, at step 410 of this method, the system may recognize or be informed as to an identity of a brand or type of luminaire or other structure associated with the system. At step 420, of system queries a local or remote database, or otherwise receives a generic thermal correction model 430 specific to the brand or type of luminaire or other structure associated with the system. Although a good starting point for a temperature correction, the generic thermal correction model will not perform as accurately as the methods and systems described or otherwise envisioned herein. At step 440 of the method, the system uses temperature measurements as described herein and modifies the generic thermal correction model accordingly to create a specific temperature correction model 450. This specific temperature correction model 450 can be used to correct future temperature readings obtained by the luminaire or other structure associated with the system.

According to another embodiment of the system, the temperature correction is not a first order thermal model, but is instead a spatial extrapolation model configured to determine the room air temperature from the temperature sensors (at elevated temperatures) despite thermal boundary layers and/or internal heat spreading based on a compact or empirical thermal model of the latter. For example, this temperature correction model comprises: (i) thermal resistance of the thermal boundary layer below the structure or sensor module, which can be derived empirically and/or from external sources of information, and which should be substantially constant for a limited temperature range; (ii) thermal resistance and capacity from the temperature sensors to the, which should be substantially constant for a limited temperature range; and/or (iii) internal thermal resistances and capacities between the internal temperature sensors and the structure or sensor box.

According to the methods and systems described or otherwise envisioned herein, the heating and temperature ranges in structures such as luminaires, and sensor boxes, are often so small that approximation by a thermal resistance network or compact model becomes feasible, which is utterly unfeasible in the general case. Accordingly, deconvolution of the sensor temperature signal may resolve thermal capacities.

According to an embodiment utilized to generate the alternative spatial extrapolation temperature correction model, the system comprises multiple internal local-temperature sensors at several locations, preferably at several depths, in the structure. For example, the system may comprise multiple internal local-temperature sensors on the printed circuit board (PCB), in the sensor bundle, and/or in the structure.

Figure 20:
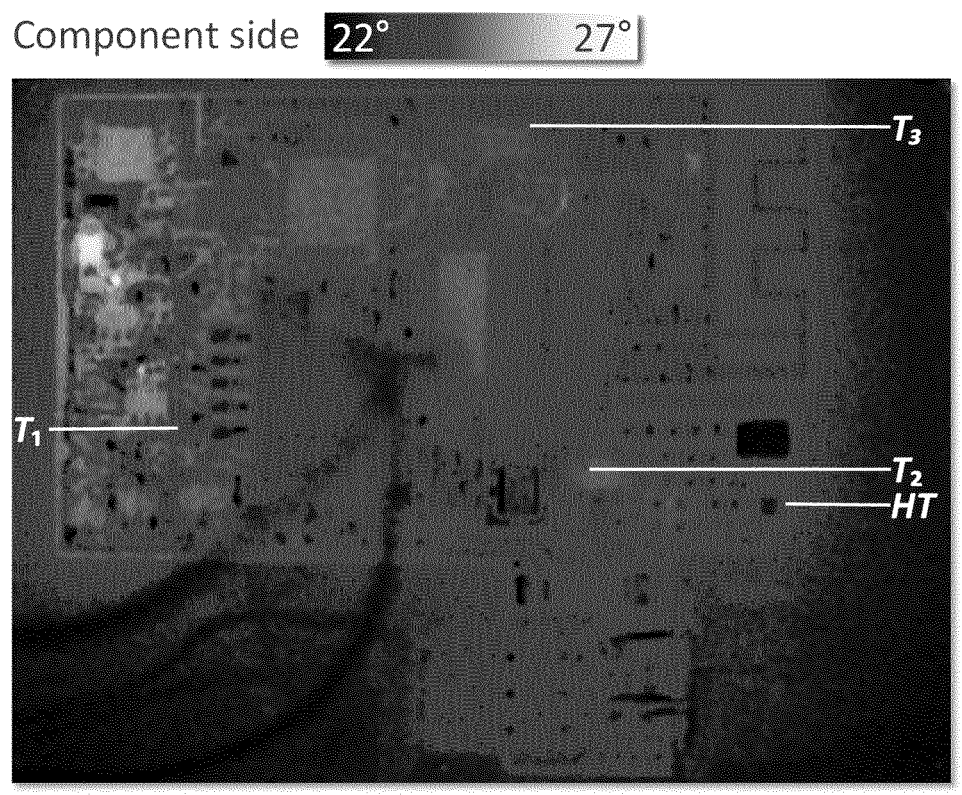
FIG. 20 is a thermogram of a printed control board, in accordance with an embodiment.
Figure 21:
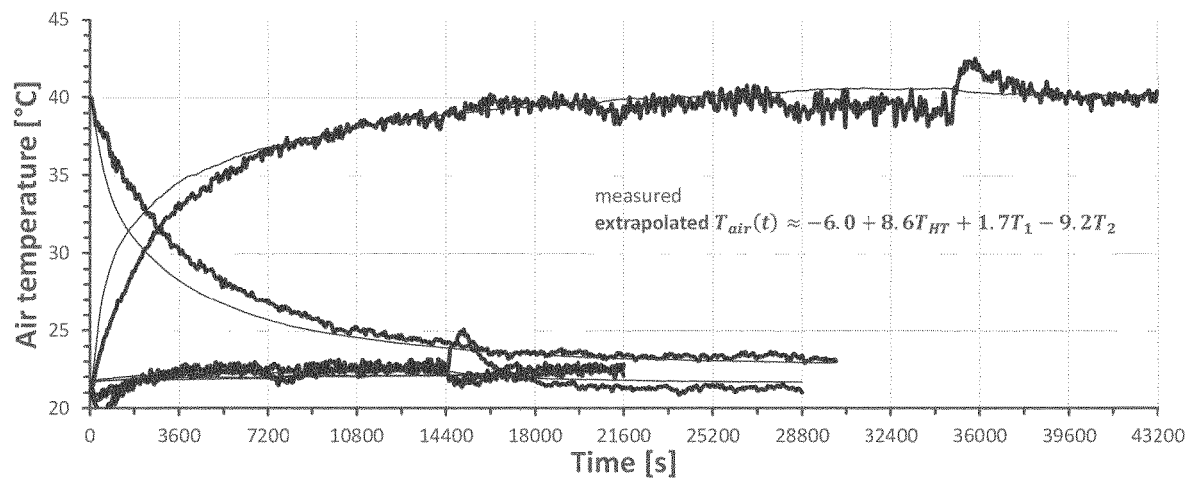
FIG. 21 is a graph of measured temperature gradients and differences, in accordance with an embodiment.

FIG. 20 comprises multiple local-temperature sensor locations (shown by HT sensor and $T_1$, $T_2$ and $T_3$ NTCs) on a PCB, with a thermogram in operation to show temperature visually. Power dissipation, such as that in the LED driver and the controller(s) in the system, is partly conducted in the PCB, generating temperature gradients and differences such as the example shown in FIG. 21. Spatial temperature extrapolation is facilitated by considerable temperature differences. According to an embodiment, the PCB shape and layout can be designed to maximize temperature differences between sensors by minimizing the thermal resistance between the HT-sensor and the air and increasing the thermal resistance between the HT-sensor and power dissipating components like the controller and the driver.

The system then predetermines a resistive(-capacitive-inductive) compact thermal model, such as:

$$T_{air}(t) \approx -4.8 + 7.8 T_{HT} - 6.7 T_2 + 12 \frac{dT_{HT}}{dt} \qquad \text{(Eq. 3)}$$

for example by parameter estimation to fit premeasured step responses. The resistances and capacitances are generally lumped in a non-trivial way.

Figure 22:
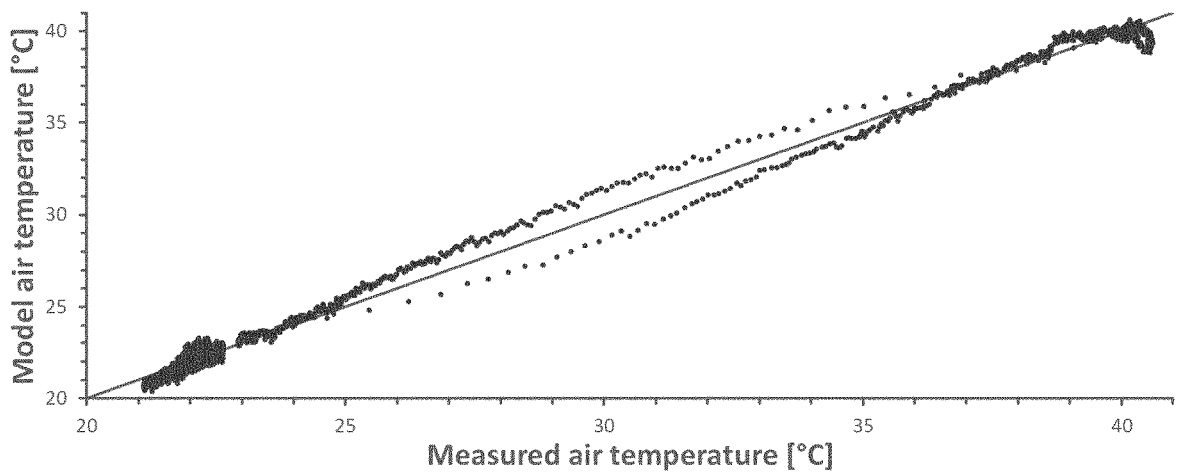
FIG. 22 is a graph comparing extrapolations with air temperature measurements, in accordance with an embodiment.

The internal local-temperature sensor temperatures can be extrapolated to room air temperature using the predetermined resistive(-capacitive-inductive) compact thermal model. FIG. 22, in accordance with an embodiment, compares extrapolations with air temperature measurements, where the internal local-temperature sensor temperatures were generated by sensors inside a sensor box associated with a luminaire.

The methods and systems described or otherwise envisioned herein can be configured, adapted, and utilized for many different applications. According to one embodiment, the system comprises a connected office luminaire with an integrated temperature sensor. The sensor can be a separate sensor module, a temperature sensor within a relative humidity sensor module, and/or any other sensor or microprocessor with an internal temperature sensor. The lighting controller computes the temperature correction based on the dimming level of the LED panel and on the state of the electronic circuitry. The corrected temperature readings are communicated to the lighting infrastructure, and the lighting infrastructure can share the thermal information with other building automation systems.

According to another embodiment, the system comprises a light bulb with an integrated temperature sensor. This sensor could be a separate sensor module, a temperature sensor within a relative humidity sensor module, and/or any other sensor or microprocessor with an internal temperature sensor. The lighting controller computes the temperature correction based on the dimming level of the LED light bulb or tube.

According to another embodiment, the system comprises a connected sensor module with an integrated temperature sensor. This sensor could be a separate sensor module, a temperature sensor within a relative humidity sensor module, and/or any other sensor or microprocessor with an internal temperature sensor. The sensor module computes the temperature correction based on the state of the electronic circuitry. The corrected temperature readings are communicated to the lighting infrastructure, and the lighting infrastructure can share the thermal information with other building automation systems.

According to an embodiment, the temperature correction model is created during periods where the ambient temperature is not changing during the change in dimming level. For example, the system may comprise a timer such that the calibration process is performed during night. These periods can also be detected by presence detection sensors, so that only periods with absence of people are used. Similarly, a light level sensor can be used to detect periods without sunlight to avoid the impact of external heating. Also, measurements from other radiative temperature sensors and/or sun irradiation measurements can be used.

According to one embodiment, the temperature correction model is created by using the temperature of adjacent luminaires with constant dimming level during the change in dimming level. According to one embodiment, the temperature correction model is created by using the temperature of other equipment like HVAC during the change in dimming level. Also, information provided by other remote temperature sensors/thermostats in the vicinity could be used. According to another embodiment, the temperature readings of a humidity sensor are corrected so that the relative humidity can be computed more accurately, similar to the methods and systems described herein to modify temperature readings. According to one embodiment, an initial temperature correction model can be used which is optimized during operation.

According to another embodiment, measurements from other luminaires, and/or from radiative temperature sensors, and/or sun irradiation measurements may be combined and processed to account for lateral temperature variations and/or systematic measurement artifacts.

According to one embodiment, multiple temperature sensors with different isolation properties with respect to the ambient air and power dissipating components of the luminaire and/or sensor box are used. Internal temperature differences are used to extrapolate the ambient air temperature and/or improve the accuracy of other embodiments. These and many other embodiments and applications are possible.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The invention claimed is:

1. A method for determining a temperature in a region of an environment by compensating for heat-up of a temperature sensor caused by ambient air and/or electronic heating, using a system comprising: a structure in the environment; a controller; and a temperature sensor associated with the structure, the method comprising:
   obtaining, using the temperature sensor, one or more first temperature measurements while the structure is in a first operating mode;
   changing the first operating mode of the structure to a second operating mode;
   obtaining, using the temperature sensor, one or more second temperature measurements while the structure is in the second operating mode;
   determining, by the controller using the one or more first temperature measurements and the one or more second temperature measurements, a temperature correction comprising an effect of the second operating mode of the structure on the temperature sensor;
   obtaining, using the temperature sensor after the temperature correction is determined, a new temperature measurement during operation of the structure in the second operating mode; and
   adjusting, using the temperature correction, the new temperature measurement to generate a compensated temperature measurement,
   wherein the first operating mode is a first dimming level of a luminaire and the second operating mode is a second dimming level of the luminaire, the first dimming level and the second dimming level being different dimming levels.

2. The method of claim 1, further comprising:
   communicating the compensated temperature measurement.

3. The method of claim 1, wherein a temperature correction is determined for a plurality of operating modes of the structure.

4. The method of claim 1, wherein the step of determining a temperature correction further comprises modification of a preexisting temperature correction model associated with the structure.

5. The method of claim 1, wherein the system comprises a sensor box comprising the temperature sensor, and wherein the sensor box is associated with the structure.

6. The method of claim 1, wherein the temperature correction compensates for heat generated by the controller of the system.

7. The method of claim 1, wherein the step of determining a temperature correction comprises obtaining one or more temperature measurements from an adjacent structure.

8. The method of claim 1, wherein the temperature correction comprises a first order thermal model.

9. A system configured to determine a temperature in a region of an environment by compensating for heat-up of a temperature sensor caused by ambient air and/or electronic heating, comprising:
- a structure in the environment;
- a controller; and
- a temperature sensor associated with the structure and configured to obtain: one or more first temperature measurements while the structure is in a first operating mode; and one or more second temperature measurements while the structure is in the second operating mode;
- the controller being configured to: change the first operating mode of the structure to the second operating mode; determine, using the one or more first temperature measurements and the one or more second temperature measurements, a temperature correction comprising an effect of the second operating mode of the structure on the temperature sensor; and adjust, using the temperature correction, a new temperature measurement obtained during operation of the structure in the second operating mode to generate a compensated temperature measurement,
- wherein the first operating mode is a first dimming level of a luminaire and the second operating mode is a second dimming level of the luminaire, the first dimming level and the second dimming level being different dimming levels.

10. The system of claim 9, wherein the controller is further configured to direct the system to communicate the compensated temperature measurement.

11. The system of claim 9, wherein the temperature correction compensates for heat generated by the controller of the system.

12. The system of claim 9, wherein the system comprises a sensor box comprising the temperature sensor, and wherein the sensor box is associated with the structure.

13. The system of claim 12, wherein the sensor box comprises a second sensor different from the temperature sensor.

* * * * *